(12) United States Patent
Nagesh Shetigar et al.

(10) Patent No.: US 10,524,173 B2
(45) Date of Patent: Dec. 31, 2019

(54) SYSTEM AND METHOD TO FACILITATE SHARING BEARER INFORMATION IN A NETWORK ENVIRONMENT

(71) Applicant: CISCO TECHNOLOGY, INC., San Jose, CA (US)

(72) Inventors: Madhur Raj Nagesh Shetigar, Bangalore (IN); Vinayak Prabhu, Bangalore (IN); Kushal Mittal, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 71 days.

(21) Appl. No.: 15/089,271

(22) Filed: Apr. 1, 2016

(65) Prior Publication Data

US 2017/0245184 A1 Aug. 24, 2017

Related U.S. Application Data

(60) Provisional application No. 62/299,285, filed on Feb. 24, 2016.

(51) Int. Cl.
*H04W 36/00* (2009.01)
*H04J 11/00* (2006.01)
(Continued)

(52) U.S. Cl.
CPC ......... *H04W 36/0088* (2013.01); *H04J 11/00* (2013.01); *H04W 36/0027* (2013.01);
(Continued)

(58) Field of Classification Search
None
See application file for complete search history.

(56) References Cited

U.S. PATENT DOCUMENTS 7,957,349 B2 * 6/2011 Kim ...................... H04W 36/02
370/331
8,879,551 B2 11/2014 Anthony, Jr. et al.
(Continued)

FOREIGN PATENT DOCUMENTS

CN 102045802 A 5/2011
WO 2011095358 A1 8/2011
(Continued)

OTHER PUBLICATIONS

Extended European Search Report for Application No. 17157934.5-1854 dated Jul. 21, 2017.
(Continued)

*Primary Examiner* — Christopher T Wyllie
(74) *Attorney, Agent, or Firm* — Patterson + Sheridan, LLP

(57) ABSTRACT

An example method is provided in one example embodiment and may include maintaining a count of packets forwarded to a target evolved Node B (eNodeB) from a source eNodeB during a handover of a user equipment (UE) from the source eNodeB to the target eNodeB; and communicating an end marker indication message from the source eNodeB to the target eNodeB including the count of packets forwarded to the target eNodeB upon handover of the UE to the target eNodeB. A count of packets can be maintained for each bearer of the UE. A separate end marker indication message can be communicated to the target eNodeB for each bearer of the UE. The count of packets can be included in a Private Extension Information Element (IE) of the end marker indication message. In some embodiments, Radio Link Control (RLC) tuning parameters can be included in the Private Extension IE.

20 Claims, 9 Drawing Sheets

(51) Int. Cl.
  *H04W 36/02* (2009.01)
  *H04W 88/02* (2009.01)
  *H04W 88/08* (2009.01)
  *H04W 24/04* (2009.01)
(52) U.S. Cl.
  CPC .......... *H04W 36/023* (2013.01); *H04W 24/04* (2013.01); *H04W 88/02* (2013.01); *H04W 88/08* (2013.01)

(56) References Cited

U.S. PATENT DOCUMENTS

| | | | |
|---|---|---|---|
| 8,902,852 B2 | 12/2014 | Jaiswal et al. | |
| 8,929,292 B2 | 1/2015 | Anthony, Jr. et al. | |
| 2003/0104816 A1* | 6/2003 | Duplessis | H04W 36/14 455/448 |
| 2008/0123673 A1* | 5/2008 | Lee | H04L 1/1874 370/412 |
| 2008/0192700 A1* | 8/2008 | Lee | H04W 36/02 370/331 |
| 2008/0212583 A1* | 9/2008 | Rey | H04L 12/1836 370/390 |
| 2009/0046661 A1* | 2/2009 | Casati | H04L 47/10 370/331 |
| 2009/0052397 A1* | 2/2009 | Meylan | H04L 1/1841 370/331 |
| 2009/0061876 A1* | 3/2009 | Ho | H04W 99/00 455/436 |
| 2009/0323533 A1* | 12/2009 | Ohta | H04W 36/02 370/236 |
| 2010/0027503 A1* | 2/2010 | Eravelli | H04W 36/02 370/331 |
| 2010/0034169 A1* | 2/2010 | Maheshwari | H04L 1/1874 370/331 |
| 2010/0135249 A1* | 6/2010 | Meyer | H04L 1/1841 370/331 |
| 2010/0157944 A1* | 6/2010 | Horn | H04W 36/0005 370/331 |
| 2010/0272006 A1* | 10/2010 | Bertrand | H04B 7/2606 370/315 |
| 2012/0294276 A1* | 11/2012 | Jaiswal | H04W 36/023 370/331 |
| 2012/0294277 A1* | 11/2012 | Jaiswal | H04W 36/023 370/331 |
| 2012/0314688 A1* | 12/2012 | Taleb | H04W 36/08 370/331 |
| 2013/0021940 A1* | 1/2013 | Keskitalo | H04W 36/0088 370/252 |
| 2013/0058308 A1* | 3/2013 | Jaiswal | H04W 36/12 370/331 |
| 2013/0324114 A1* | 12/2013 | Raghothaman | H04W 8/005 455/426.1 |
| 2014/0233384 A1 | 8/2014 | Howard | |
| 2014/0254554 A1* | 9/2014 | Liu | H04W 36/0055 370/331 |
| 2015/0223124 A1* | 8/2015 | Wang | H04W 24/08 455/436 |
| 2015/0327137 A1* | 11/2015 | Zhang | H04W 48/18 370/331 |
| 2015/0358886 A1 | 12/2015 | Qin | |
| 2016/0095034 A1* | 3/2016 | Hampel | H04W 36/14 370/331 |
| 2016/0227454 A1* | 8/2016 | Toskala | H04W 36/0033 |
| 2017/0041842 A1* | 2/2017 | Yoon | H04W 36/02 |
| 2017/0126618 A1* | 5/2017 | Bhaskaran | H04L 61/2007 |
| 2017/0195933 A1* | 7/2017 | Shi | H04W 36/38 |

FOREIGN PATENT DOCUMENTS

| | | |
|---|---|---|
| WO | WO2013/135914 | 9/2013 |
| WO | WO2013/144747 | 10/2013 |
| WO | WO2014/110410 | 7/2014 |

OTHER PUBLICATIONS

"RNTI, LTE Quick Reference," ShareTechnote, Published on or about Nov. 28, 2012; 5 pages.
"RLC," ShareTechnote, Published on or about Jul. 16, 2012; 28 pages.
"Cisco ASR 5x00 System Architecture Evolution, Gateway Administration Guide, Version 15.0," Cisco Systems, Inc., San Jose, CA, Oct. 31, 2014; 582 pages.
Kundalkar, Siddhartha, et al., "LIPA: Local IP Access via Home Node B," Radisys Corporation, White Paper, Sep. 2011, 11 pages.
"3GPP TS 29.281 V13.0.0 (Sep. 2015) Technical Specification: 3$^{rd}$ Generation Partnership; Technical Specification Group Core Network and Terminals; General Packet Radio System 9GPRS) Tunnelling Protocol User Plane (GTPv1-U) (Release 13)," 3$^{rd}$ Generation Partnership Project, 650 Route des Lucioles—Sophia Antipolis Valbonne—France, Sep. 2015; 28 pages.
"ETSI TS 136 300 V13.2.0 (Jan. 2016) Technical Specification: LTE; Evolved Universal Terrestrial Radio Access (E-UTRA) and Evolved Universal Terrestrial Radio Access Network (E-UTRAN); Overall description; Stage 2 (3GPP TS 36.300 version 13.2.0 Release 13)," ETSI, 650 Route des Lucioles—Sophia Antipolis Valbonne—France, Jan. 2016; 299 pages.
"ETSI TS 136 322 V13.0.0 (Jan. 2016) Technical Specification: LTE; Evolved Universal Terrestrial Radio Access (E-UTRA); Radio Link Control (FLC) protocol specification (3GPP TS 36.322 version 13.0.0 Release 13)," ETSI, 650 Route des Lucioles—Sophia Antipolis Valbonne—France, Jan. 2016; 47 pages.
"ETSI TS 136 323 V8.5.0 (Apr. 2009) Technical Specification: LTE; Evolved Universal Terrestrial Radio Access (E-UTRA); Packet Data Convergence Protocol (PDCP) specification (3GPP TS 36..323 version 8.5.0 Release 8)," ETSI, 650 Route des Lucioles—Sophia Antipolis Valbonne—France, Apr. 2009; 26 pages.
"ETSI TS 136 331 V13.0.0 (Jan. 2016) Technical Specification: LTE; Evolved Universal Terrestrial Radio Access (E-UTRA); Radio Resource Control (RRC); Protocol specification (3GPP TS 36.331 version 13.0.0 Release 13)," ETSI, 650 Route des Lucioles—Sophia Antipolis Valbonne—France, Jan. 2016; 670 pages.

\* cited by examiner

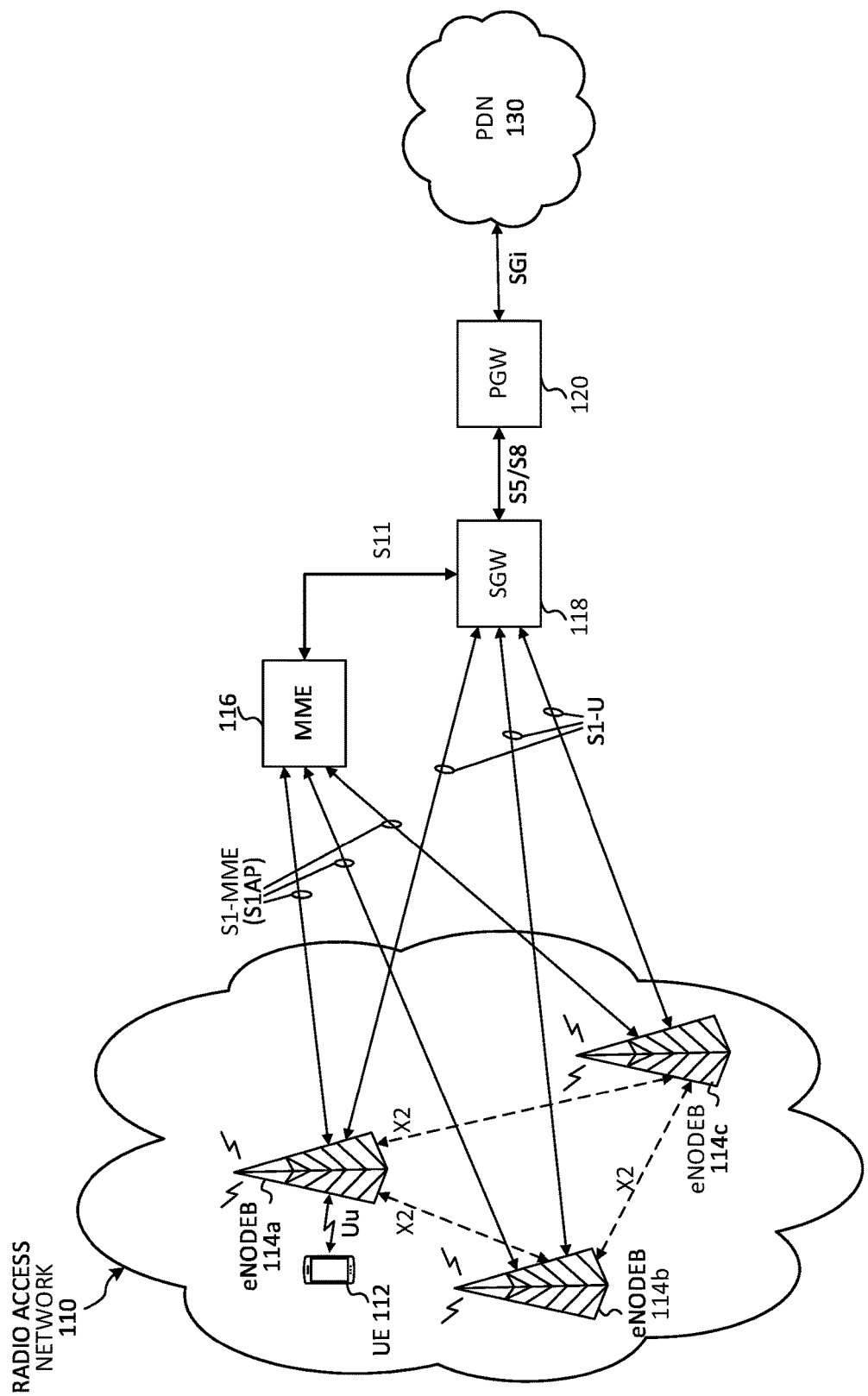

FIG. 1C
160

| Octets | 8 | 7 | 6 | 5 | 4 | 3 | 2 | 1 |
|---|---|---|---|---|---|---|---|---|
| 1 | | 0x1 | | 0x1 | 0 | 0 | 0 | 0 |
| 2 | Message Type = 254(End Marker) ||||||||
| 3 | Length = 0x0(1st Octet) ||||||||
| 4 | Length = 0x9 (2nd Octet) ||||||||
| 5 | 0x0(TEID) ||||||||
| 6 | 0x0(TEID) ||||||||
| 7 | 0x0(TEID) ||||||||
| 8 | 0x2(TEID) ||||||||
| 9 | Type = 255 (Decimal) ||||||||
| 10 | Length = 0x0(1st Octet) ||||||||
| 11 | Length = 0x6(2nd Octet) ||||||||
| 12 | Private Extension Identifier=0xB6 (1st Octet) ||||||||
| 13 | Private Extension Identifier =0x0E (2nd Octet) ||||||||
| 14 | Private Extension Value (Tag) = 0x1(1st Octet) ||||||||
| 15 | Private Extension Value(Length) = 0x0(2nd Octet) ||||||||
| 16 | Private Extension Value(Length)=0x1(3rd Octet) ||||||||
| 17 | Private Extension Value(Value) = 0xa(4th Octet) ||||||||

162 — rows 1–8
164 — rows 9–17
166 — rows 12–13
168 — rows 14–17
170, 172, 174

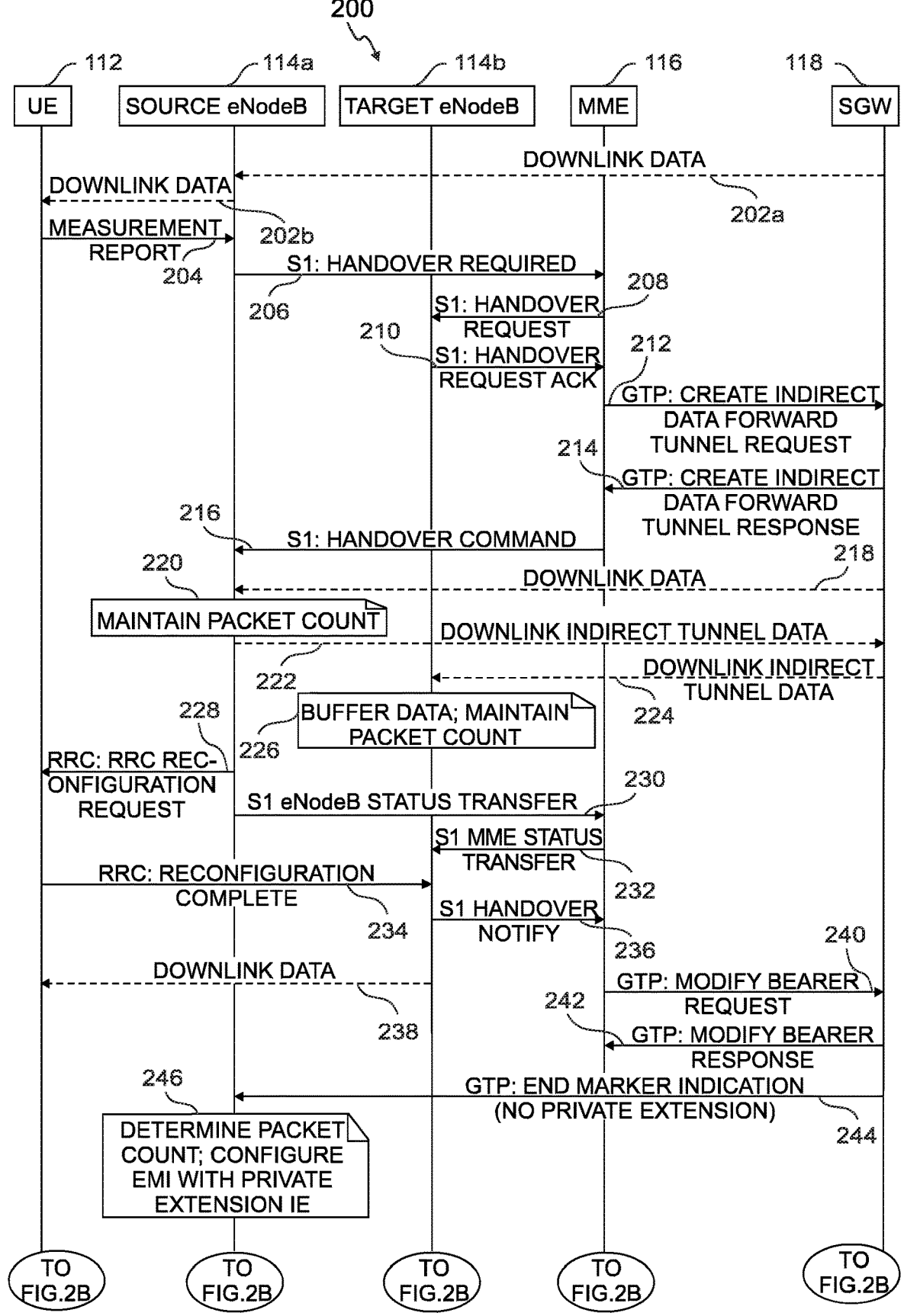

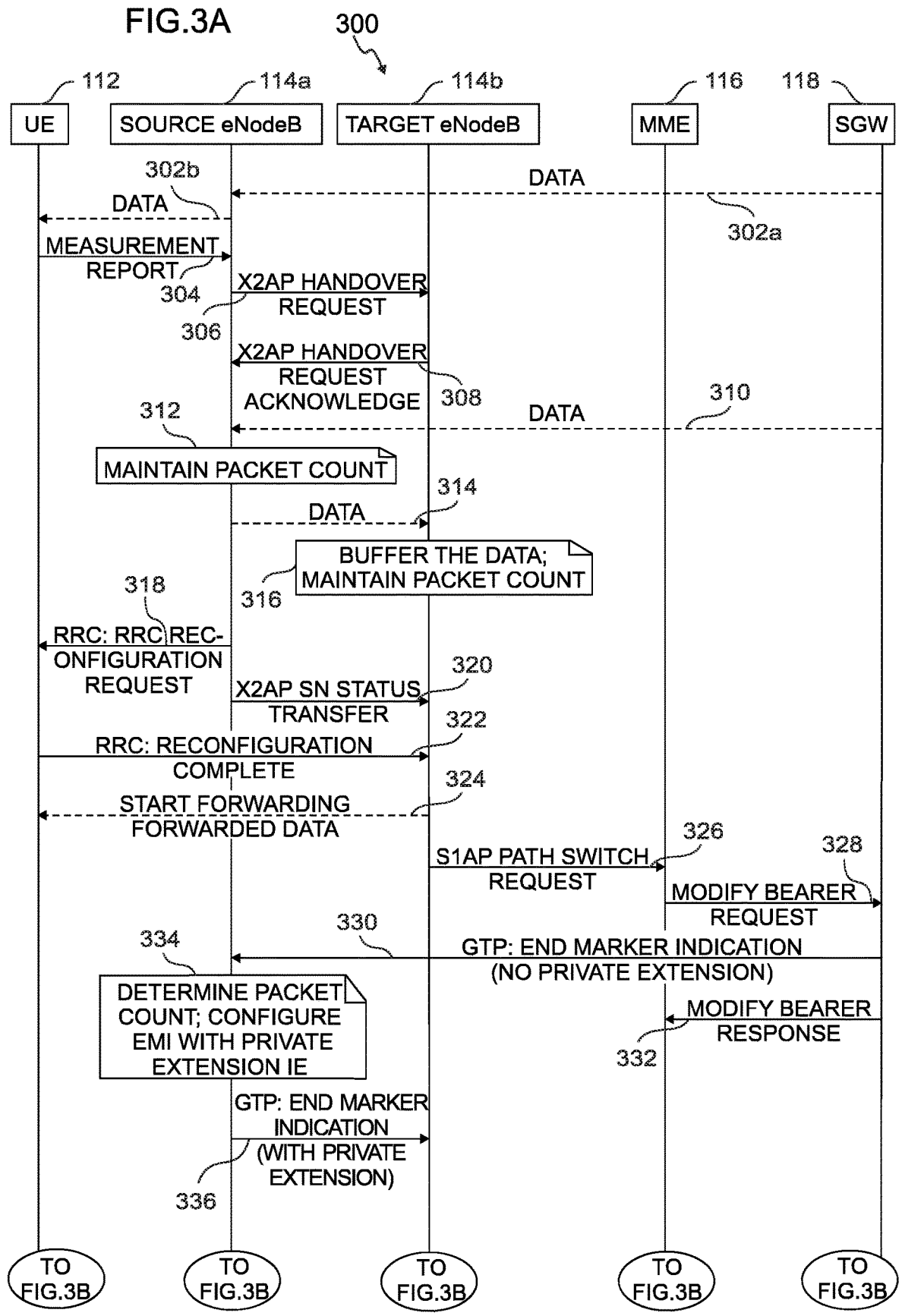

FIG. 4
400

| Octets | 8 | 7 | 6 | 5 | 4 | 3 | 2 | 1 |
|---|---|---|---|---|---|---|---|---|
| 1 | | 0x1 | | 0x1 | 0 | 0 | 0 | 0 |
| 2 | Message Type = 254(End Marker) ||||||||
| 3 | Length = 0x0(1st Octet) ||||||||
| 4 | Length = 0xf (2nd Octet) ||||||||
| 5 | 0x0(TEID) ||||||||
| 6 | 0x0(TEID) ||||||||
| 7 | 0x0(TEID) ||||||||
| 8 | 0x2(TEID) ||||||||
| 9 | Type = 255 (Decimal) ||||||||
| 10 | Length = 0x0(1st Octet) ||||||||
| 11 | Length = 0xc(2nd Octet) ||||||||
| 12 | Private Extension Identifier=0xB6 (1st Octet) ||||||||
| 13 | Private Extension Identifier =0x0E (2nd Octet) ||||||||
| 14 | Private Extension Value (Tag) = 0x1(1st Octet) ||||||||
| 15 | Private Extension Value(Length) = 0x0(2nd Octet) ||||||||
| 16 | Private Extension Value(Length)=0x1(3rd Octet) ||||||||
| 17 | Private Extension Value(Value) = 0xa(4th Octet) ||||||||
| 18 | Private Extension Value(Tag) = 0x4(5th Octet) ||||||||
| 19 | Private Extension Value(Length) = 0x0 ||||||||
| 20 | Private Extension Value(Length) = 0x3 ||||||||
| 21 | Private Extension Value(Value) = 0x3(pollPDU) ||||||||
| 22 | Private Extension Value(Value) = 0x2(pollByte) ||||||||
| 23 | Private Extension Value(Value) = 0x5(T-StatusProhibit) ||||||||

402 — rows 1–8
404 — rows 9–23
406 — rows 12–13
408 — rows 14–17
410 — rows 18–23

412, 414, 416, 418, 420

SYSTEM AND METHOD TO FACILITATE SHARING BEARER INFORMATION IN A NETWORK ENVIRONMENT

CROSS-REFERENCE TO RELATED APPLICATION

This application claims the benefit of priority under 35 U.S.C. § 119(e) to U.S. Provisional Application Ser. No. 62/299,285, entitled "SYSTEM AND METHOD TO SHARE BEARER CHARACTERISTICS DURING HANDOVER AND VALIDATE HANDOVER IN LTE," filed Feb. 24, 2016, which is hereby incorporated by reference in its entirety.

TECHNICAL FIELD

This disclosure relates in general to the field of communications and, more particularly, to a system and method to facilitate sharing bearer information network environment.

BACKGROUND

Networking architectures have grown increasingly complex in communications environments, particularly mobile wireless environments. Data traffic has grown extensively in recent years, which has significantly increased the demands on network resources. As the number of mobile subscribers increases, efficient management of communication resources becomes even more critical. In Long Term Evolution (LTE) systems, handover (HO) from one cell radio (e.g., a source cell radio) to another cell radio (e.g., a target cell radio) plays an important role in enhancing user experience. In some instances, data packets are forwarded from a source cell radio to a target cell radio during handover. Currently, there is no mechanism to verify whether all packets forwarded from a source cell radio to a target cell radio have reached the target. Accordingly, there are significant challenges in verifying whether all data packets forwarded from a source cell radio reach a target cell radio.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 1A is a simplified block diagram illustrating a communication system to facilitate sharing bearer information and/or parameters network environment according to one embodiment of the present disclosure;

FIG. 1C is a simplified schematic diagram illustrating an example End Marker Indication message including a Private Extension field that can be used in accordance with one potential embodiment of the communication system;

FIGS. 2A-2B are a simplified interaction diagram illustrating example details that can be associated with sharing bearer information and/or parameters during an S1 handover in network environment in accordance with one potential embodiment of the communication system;

FIGS. 3A-3B are a simplified interaction diagram illustrating example details that can be associated with sharing bearer information and/or parameters during an X2 handover in accordance with one potential embodiment of the communication system;

FIG. 4 is a simplified schematic diagram illustrating another example End Marker Indication message including a Private Extension field that can be used in accordance with one potential embodiment of the communication system.

DETAILED DESCRIPTION OF EXAMPLE EMBODIMENTS

Overview

Figure 1B:
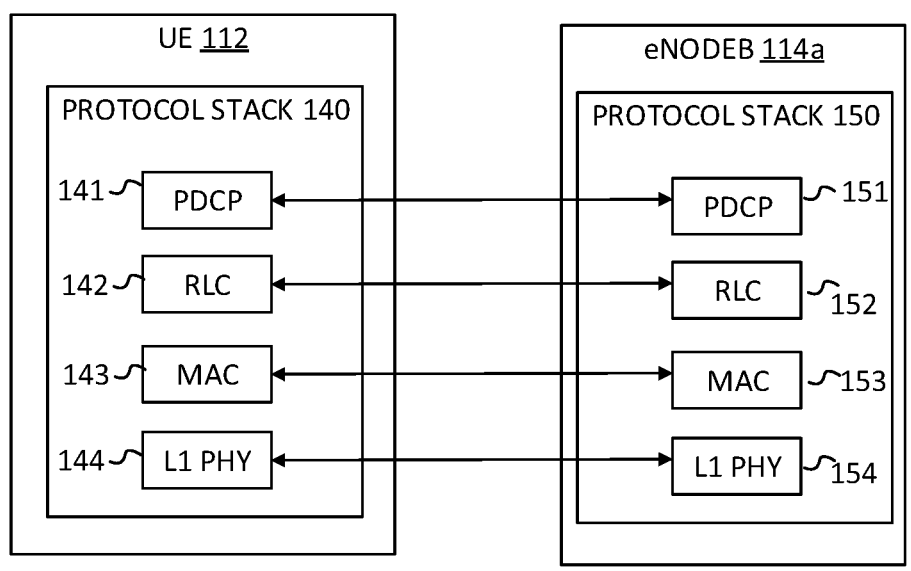
FIG. 1B is a simplified block diagram illustrating example details that can be associated the communication system.

A method is provided in one example embodiment and may include maintaining a count of packets forwarded to a target evolved Node B (eNodeB) from a source eNodeB during a handover of a user equipment (UE) from the source eNodeB to the target eNodeB; and communicating an end marker indication message from the source eNodeB to the target eNodeB including the count of packets forwarded to the target eNodeB upon handover of the UE to the target eNodeB. In one instance, maintaining the count of packets can include maintaining a count of packets for each bearer of the UE and a separate end marker indication message can be communicated to the target eNodeB for each bearer of the UE using a separate tunnel established for each bearer of the UE. In one instance, each tunnel can be a General Packet Radio Service (GPRS) Tunneling Protocol (GTP) user data plane (GTPU) tunnel. In some cases, wherein the count of packets provided in the Private Extension IE can be configured in a Tag, Length, Value (TLV) format.

In one instance, the count of packets can be included in a Private Extension Information Element (IE) of the end marker indication message. In one instance, the Private Extension IE can include an extension identifier having a value of 46606. In some cases, the method can include determining Radio Link Control (RLC) tuning parameters at the source eNodeB and including the RLC tuning parameters in the Private Extension IE along with the count of the packets for each UE bearer.

Example Embodiments

For purposes of understanding certain embodiments of systems and methods disclosed herein, it is important to appreciate the technologies and data that may be associated with network communications. The following foundational information may be viewed as a basis from which the present disclosure may be properly explained.

In Long Term Evolution (LTE) communication architectures, handover (HO) of a user equipment (UE) from one evolved Node B (eNodeB or eNB) to another eNodeB plays an important role in enhancing user experience and is also a salient feature which distinguishes LTE from competing parallel technologies. In a case of lossless handover or seamless handover, data packets are forwarded for a brief period of time during handover initiation.

In evolved Universal Mobile Telecommunication System (UMTS) Terrestrial Radio Access/UMTS Terrestrial Radio Access (E-UTRA/UTRA) communication architectures there are two types of handovers: lossless handovers and seamless handovers, which can vary be based on the characteristics of traffic involved in the handover. In general, lossless handovers are suitable for traffic which is sensitive to Packet Error Loss but is less sensitive to Packet Delay. For example, lossless handovers can sometimes involve File Transfer Protocol (FTP) traffic. From the LTE User Plane perspective this traffic is typically mapped to Radio Link Control (RLC) Acknowledge Mode (AM). In general seamless handovers are suitable for traffic which is sensitive to Packet Delay but is less sensitive to Packet Error Loss. For example, seamless handovers can sometimes involve Voice over IP (VOIP) traffic. From the LTE User Plane perspective this traffic is typically mapped to RLC Unacknowledged Mode (UM).

RLC AM and RLC UM are defined in 3GPP Technical Specification (TS) 36.322. Typically, architectures that facilitate network communications generally rely upon three basic components: a data plane, a control plane, and a management plane. The data plane carries user traffic, while the control plane and the management plane serve the data plane. As referred to herein in this Specification, the term 'plane' can refer to a separation of traffic that can traverse a network. As referred to herein in this Specification, the terms 'user plane', 'data plane' and 'user data plane' can be used interchangeably.

Generally, UEs and eNodeBs can include a protocol stack which facilitates communication exchanges between UEs and eNodeBs. A protocol stack typically includes one or more protocol layers or sublayers. The terms 'protocol layer', 'layer' or 'sublayer', as referred to herein, can be any layer in a multi-layered protocol stack or scheme that facilitates communications between layers, such as, for example, the Open Systems Interconnection (OSI) Model, using one or more communication protocols. In some instances, protocol layers or sublayers, as discussed herein, can be referred to more generally without explicitly including the term 'protocol layer' or 'sublayer'.

A typical user plane protocol stack for a UE or an eNodeB, which can facilitate user data plane communications between the network elements or nodes, can include a Packet Data Convergence Protocol (PDCP) layer, a Radio Link Control (RLC) layer, a Medium Access Control (MAC) layer and a Physical (PHY) layer, typically referred to as a Layer 1 (L1) PHY layer. A typical control plane protocol stack for a UE or an eNodeB, which can facilitate control plane communications between the network elements or nodes, can include a Radio Resource Control (RRC) layer, a PDCP layer, an RLC layer, a MAC layer and an L1 PHY layer.

During operation, packets received at a subsequent layer from a previous layer in a protocol stack but which the subsequent layer has not yet operated on can be referred to as Service Data Units (SDUs). Packets operated on at the subsequent layer can be referred to as Packet or Protocol Data Units (PDUs). As discussed herein in this Specification, a packet is a formatted unit of data and can contain both control information (e.g., source and destination address, etc.) and data, which is also known as payload. In some embodiments, control information can be included in headers and trailers for packets. Messages can be sent and received according to any suitable communication messaging protocols. Suitable communication messaging protocols can include a multi-layered scheme such as the OSI Model, or any derivations or variants thereof. The terms 'data', 'information' and 'parameters' as used herein can refer to any type of binary, numeric, voice, video, textual or script data or information or any type of source or object code, or any other suitable data or information in any appropriate format that can be communicated from one point to another in electronic devices and/or networks. Additionally, messages, requests, responses, replies, queries, etc. are forms of network traffic and, therefore, may comprise one or more packets.

Generally, during operation in a downlink scenario (e.g., for packets that are to be sent from a network toward a given UE), the PDCP layer can apply an air encryption and/or other addressing/control information to packets based on control signaling received from the RRC layer and can generate PDCP PDUs. The RLC layer can operate on PDCP PDUs as RLC SDUs and can generate RLC PDUs to output to the MAC layer. Among other things, the RLC layer can concatenate and segment higher layer PDCP PDUs into pre-derived packetized data blocks that can be passed to the MAC layer based on control signaling received from the RRC layer. The MAC layer can include a scheduler, which can operate on the RLC PDUs as MAC SDUs and can generate MAC PDUs, which can include data and/or control information allocated to physical Resource Blocks. RBs can be constructed at the L1 PHY layer using the data/control information included in each MAC PDU and transmitted over-the-air (OTA) to a given using a number of transport blocks for a number of subframes.

During a handover execution phase when a given UE moves from a source eNodeB to a target eNodeB there will be some time period when the UE does not a have radio connection with either the source eNB or with the target eNB. During this time period, packets arriving from a Packet Data Network (PDN) toward the UE will be buffered at the source eNodeB PDCP layer.

From the PDCP layer perspective, there are two kinds of packets buffered during this phase, which include PDCP PDUs and PDCP SDUs. PDCP SDUs are packets which the PDCP layer has received from an upper layer but has not yet assigned a sequence number (SN) to the packets. PDCP PDUs are packets which the PDCP layer has received from an upper layer and it has already assigned a SN (Sequence Number). The SN can be used to verify packet ordering, whether duplicate packets have been received at a UE, etc.

In a case of Lossless Handover, which is used for bearers mapped onto an RLC Acknowledge Mode, the PDCP layer is to forward both buffered PDCP PDUs and SDUs to the target eNodeB. Whereas in a case of Seamless Handover, which is for bearers mapped onto an RLC Unacknowledged Mode, the PDCP layer is to forward only buffered PDCP SDUs to the target eNodeB. A Radio Access Bearer (RAB) or, more generally, a 'bearer' can refer to a path, channel, tunnel or the like through which communications can be exchanged between two endpoints for a particular service, application, etc. Typically, bearers are referred to in association to communications exchanged between a UE and one or more elements or nodes of an Evolved Packet Core (EPC) or Evolved Packet System (EPS) for LTE architectures.

At a minimum, a default bearer, as defined in 3GPP standards, is established for a given UE upon initial attachment of the UE to a given Radio Access Network (RAN) node (e.g., an eNodeB). In some instances, one or more dedicated bearers can be established for a given UE for one or more specialized services or applications provided to the UE such as, for example, a Voice over LTE (VoLTE) session, a data session, a Voice over IP (VoIP) session, a gaming session, combinations thereof or the like. In general, a bearer for a given UE is associated with the following information and/or parameters within the EPC: 1) an Internet Protocol (IP) address for the UE, which can be allocated from a pool of IP addresses via Dynamic Host Configuration Protocol (DHCP), Stateless Address Auto-configuration (SLAAC), etc.; 2) an IP address for an EPC node for a given PDN connection for the UE; and 3) at least one General Packet Radio Service (GPRS) tunneling protocol user plane (GTPU) bearer tunnel extending between a PDN Gateway (PGW) and a Serving Gateway (SGW) and at least one GTPU bearer tunnel extending from the SGW to the eNodeB to which the UE is connected (e.g., if the UE is in a CONNECTED mode or state). A bearer can be identified using an EPS Bearer Identity (EBI).

Handover processes performed in LTE architectures can include S1 Application Protocol (S1AP) handovers and an X2 Application Protocol (X2AP) handovers, which can be carried out using tunneling protocols, such as Packet Data Convergence Protocol (PDCP)/General Packet Radio Service (GPRS) tunneling protocol user plane tunneling (GTPU). S1AP handovers are typically performed when there is no X2 interface interconnected eNodeBs for a deployment.

During S1AP or X2AP handover procedures, traffic flow is shifted from a source eNodeB to a target eNodeB. 3GPP standards define certain set of traffic profile characteristics and bearer information and parameters that can be transferred from the source eNodeB to the target eNodeB, such as, for example Quality of Service (QoS) parameters such as QoS Class Identifier (QCI), maximum and minimum bitrates, etc. However, the parameters which are defined by 3GPP standards do not complete the requirements required at a source eNodeB for advanced data traffic characterization.

During handover, for example, a target eNodeB is to determine the actual count of forwarded packets per bearer from a source eNodeB to verify that all the packets forwarded from the source eNodeB have been received at the target eNodeB. Currently, however, there is no mechanism to communicate the number of packets which a source eNodeB forwarded during handover procedure to a target eNodeB. Thus, there is no means to assess any packet loss due to handover in a lossless handover.

Further problems that are not addressed in current 3GPP standards involve the lack of an ability to share bearer information with a target eNodeB such traffic modeling information and/or parameters such as characteristics of elastic or streaming data traffic that is processed and stored at a source eNodeB over a period of time. After handover to a target eNodeB, these parameters are lost as there are currently no mechanisms to transfer this information from a source eNodeB to a target eNodeB. Thus, a target eNodeB has to determine the traffic model again over a period of time.

In accordance with one embodiment, a system and method is provided via communication system 100, as shown in FIG. 1A, that overcomes the aforementioned problems (and others) by providing a solution that incorporates use of a GTPU End Marker Indication (EMI) event at a given source eNodeB to facilitate sharing bearer information and/or other parameters with a given target eNodeB according to one embodiment of the present disclosure. During handover of a given UE from a given source eNodeB to a given target eNodeB, an End Marker Indication (EMI) message sent to the source eNodeB from a given SGW can mark the end of packet transmissions for a given data bearer of the UE at the source eNodeB. At this point, without any loss of information for each of the configured data bearers, the source eNodeB will have captured a complete traffic profile model and will also have a count of packets. In various embodiments, receiving the End Marker Indication at the source eNodeB can trigger the End Marker Indication event, in which the count of packets and/or the traffic profile model for each bearer can be forwarded from the source eNodeB to the target eNodeB using a corresponding bearer GTPU Tunnel Management Message for each bearer tunnel for the UE.

In at least one embodiment, the solution according to the present disclosure can include using a Private Extension optional field present in a GTPU End Marker Indication message to carry the count of packets and/or traffic model for each bearer, which is to be transmitted from the source eNodeB to the target eNodeB. In one embodiment, the Private Extension field can be used to carry vendor or operator specific information. In another embodiment, the Private Extension field can be used to carry per bearer traffic model information and a number of packets forwarded from the source eNodeB to the target eNodeB. To enable the Private Extension field to carry this information, a proprietary protocol format is defined in accordance with one embodiment of the present disclosure.

In at least one embodiment, the architecture shown in FIG. 1A can be applied to a LTE EPS architecture. Alternatively, the depicted architecture may be applicable to other environments equally. FIG. 1B illustrates example details that can be associated with various embodiments of communication system 100 shown in FIG. 1A and is described with reference to FIG. 1A. FIG. 1C is a simplified schematic diagram illustrating an example GTPU End Marker Indication message with a Private Extension field that can be used in accordance with one potential embodiment of the communication system.

As shown in FIG. 1A, communication system 100 can include a Radio Access Network 110 in which users operating user equipment (UE) 112 can connect to one or more eNodeBs 114a-114c. Also shown in FIG. 1A, communication system 100 can include a Mobility Management Entity (MME) 116, a Serving Gateway (SGW) 118 and a Packet Data Network (PDN) Gateway (PGW) 120 and a PDN 130. Each respective eNodeB 114a-114 can have a logical connection with MME 116 via a respective S1-MME interface, which can enable S1AP control traffic exchanges between each eNodeB and the MME. Each respective eNodeB 114a-114c can further have a logical connection with SGW 118 via a respective S1-U interface, which can facilitate user data plane traffic exchanges between each eNodeB and the SGW. MME 116 can further be logically connected to SGW 118 via an S11 interface for various control signaling exchanges and SGW 118 can further be logically connected to PGW 120 via S5 and/or S8 interfaces. In general, the S8 interface is used when a UE is roaming between different network operators and the S5 interface is a network internal interface to exchange communications for a particular network operator. PGW 120 can further be logically connected to PDN 130 via an SGi interface. For purposes of various example details discussed for various embodiments described herein, it is assumed that UE 112 can connected to one or more eNodeBs (e.g., eNodeB 114a) via an OTA Uu interface.

In at least one embodiment, each eNodeB 114a-114c can exchange communications with each other via an X2 interface interconnecting the eNodeBs. Although only three eNodeBs are shown in FIG. 1A, any number of eNodeBs can be deployed in communication system 100 in accordance with various embodiments described herein. Moreover, although only one UE is shown in FIGS. 1A-1B, it should be understood that many UE can be present in communication system 100.

In general, the EPC or EPS includes network elements or nodes such as, for example: one or more MMEs, one or more Serving GPRS Support Nodes (SGSNs), one or more SGWs, one or more PGWs and one or more Policy and Charging Rules Functions (PCRFs). The elements or nodes may be used to provide various UE services and/or functions, to implement Quality of Service (QoS) levels on packet flows. The services and functions can include, but not be limited to, provisioning enhanced services such as enhanced charging, stateful firewalls and/or traffic performance optimization (TPO). An MME (e.g., MME 116) is the primary control element for the EPC. Among other things, the MME provides for UE tracking and paging procedures including, for example, retransmissions, tracking area list management, idle mode UE tracking, etc. For example, the MME can maintain tracking information for UE regarding previous and current information for UE transitions between or within Radio Access Networks (RANs). The MME further provides for UE bearer procedures including activation, deactivation and modification as well as SGW and PGW selection for UE and authentication services.

An SGW (e.g., SGW 118) is a data plane element that can manage user mobility and interfaces with RAN nodes (e.g., eNodeBs 114a-114c in RAN 110). The SGW also maintains data paths between eNodeBs and the PGW(s). A PGW (e.g., PGW 120) provides IP connectivity access network (IP-CAN) session connectivity for UEs to external packet data networks (PDNs) (e.g., PDN 130). The SGSN may provide access for legacy UMTS network devices. For example, UE in a UTRAN or Global System for Mobile Communications (GSM) Enhanced Data Rates for GSM (EDGE) radio access network (GERAN) can communicate through the SGSN to the SGW or the PGW, which can include a gateway General Packet Radio Service (GPRS) support node (GGSN) to support communication with legacy systems that may include GnGp-SGSNs. An SGSN is not shown in FIG. 1A in order to illustrate other features of the communication system.

The PCRF typically makes dynamic policy control and/or charging control decisions to apply to UE based on various Policy Charging and Control (PCC) rules. The PCRF can be configured to use user subscription information as a basis for the dynamic policy and/or charging control decisions. The subscription information may apply for both session-based and non-session based services. Dynamic policy and/or charging controls may include, but not be limited to, controlling the detection for service data flows, setting charging instructions for service data flows, setting QoS levels for service data flows and/or gating. The PCRF communicates the PCC rules to PGW(s) in the system and the PGW(s) can serve as policy enforcement points to manage QoS, online/offline flow-based charging, data generation, deep-packet inspection, lawful intercept, etc.

In some embodiments, the EPC can include a 3GPP Authentication, Authorization and Accounting (AAA) element, which is a network element responsible for AAA consideration for UE in the system. For AAA considerations, the 3GPP AAA element may provide a mobile node IP address and the accounting session identification and other mobile node states in appropriate messaging. Authentication generally refers to the process where an entity's identity is authenticated, typically by providing evidence that it holds a specific digital identity such as an identifier and the corresponding credentials. Authorization generally refers to a determination of whether a particular entity is authorized to perform a given activity. Authorization can be inherited from authentication when logging on to an application or service. Accounting generally refers to charging activities associated with subscriber traffic.

Referring to FIG. 1B, FIG. 1B is a simplified block diagram illustrating example details that can be associated communication system 100. In particular, FIG. 1B illustrates additional example user data plane details that can be associated with UE 112 and eNodeB 114a. In at least one embodiment, UE 112 can include a user data plane protocol stack 140 and eNodeB 114a can include a user data plane protocol stack 150. User data plane protocol stack 140 for UE 112 can include a PDCP layer 141, an RLC layer 142, a MAC layer 143 and an L1 PHY layer 144. User data plane protocol stack 150 for eNodeB 114a can include a PDCP layer 151, an RLC layer 152, a MAC layer 153 and an L1 PHY layer 154. Each protocol stack 140, 150 can facilitate signal termination for corresponding layers between UE 112 and eNodeB 114a, respectively. It should be understood that each eNodeB 114b-114c can also include a corresponding user data plane protocol stack. In addition, UE 112 and each eNodeB 114a-114c can include a control plane protocol stack, as discussed herein.

Each of the elements of FIGS. 1A-1B may couple to one another through simple interfaces (as illustrated) or through any other suitable connection (wired or wireless), which provides a viable pathway for network communications. Additionally, any one or more of these elements may be combined or removed from the architecture based on particular configuration needs. Communications in a network environment are referred to herein as 'messages', 'messaging' and/or 'signaling', which may be inclusive of communications using packets.

In various embodiments, communication system 100 can represent a series of points or nodes of interconnected communication paths (wired or wireless) for receiving and transmitting packets of information that propagate through communication system 100. In various embodiments, communication system 100 can be associated with and/or provided by a single network operator or service provider and/or multiple network operators or service providers. In various embodiments, communication system 100 can include and/or overlap with, in whole or in part, one or more packet data networks, such as, for example, PDN 130. Communication system 100 may offer communicative interfaces between various elements of communication system 100 and may be any local area network (LAN), wireless local area network (WLAN), metropolitan area network (MAN), wide area network (WAN), virtual private network (VPN), Radio Access Network (RAN), virtual local area network (VLAN), enterprise network, Intranet, extranet, or any other appropriate architecture or system that facilitates communications in a network environment.

In various embodiments, communication system 100 may implement user datagram protocol/Internet Protocol (UDP/IP) connections and/or transmission control protocol/IP (TCP/IP) communication language protocol in particular embodiments of the present disclosure. However, communication system 100 can alternatively implement any other suitable communication protocol, interface and/or standard, proprietary and/or non-proprietary, for transmitting and receiving messages. Other protocols, interfaces and/or communication standards that can be used in communication system 100 can include 3GPP Diameter-based protocols, RADIUS protocols, AAA signaling, a terminal access controller access-control system (TACACS), TACACS+, Proxy Mobile IP version 6 (PMIPv6), Proxy Mobile IP version 4 (PMIPv4), Extensible Messaging and Presence Protocol (XMPP), General Packet Radio Service (GPRS) Tunneling Protocol (GTP) (version 1 or version 2), Generic Route Encapsulation (GRE), Ethernet over GRE (EoGRE), etc. In various embodiments, AAA signaling can include signaling exchanges facilitated via Diameter, RADIUS, Extensible Messaging and Presence Protocol, Simple Object Access Protocol (SOAP), SOAP over Hypertext Transfer Protocol (HTTP), Representational State Transfer (REST), combinations thereof or the like.

In general, RAN 110 may provide a communications interface between UE 112, MME 116, SGW 118 and PGW 120 for one or more 3GPP and/or non-3GPP access networks via eNodeBs 114a-114c. An eNodeB (e.g., eNodeBs 114a-114c) is also responsible for selecting an MME for UE, managing radio resources, and making handover decisions for UE. Although only eNodeBs are illustrated in FIGS. 1A-1B, other cell radios such as Home eNodeBs (HeNBs), NodeBs, Home NodeBs (HNBs) or the like can be deployed in communication system 100 in accordance with various embodiments depending on access network types available in communication system 100. In various embodiments, 3GPP access networks can include a GERAN, a UTRAN, generally referred to as 3G, and/or a LTE access network such as E-UTRAN, generally referred to as 4G or LTE/LTE-Advanced (LTE-A). In various embodiments, non-3GPP IP access networks can include wireless local area networks (WLANs), such as 802.11 WiFi networks, Worldwide Interoperability for Microwave Access (WiMAX) networks, Bluetooth™ networks, combinations thereof or the like.

As referred to herein in this Specification, the terms 'user', 'subscriber', 'UE' and 'user/UE' can be used interchangeably. It should be understood that a user, or more particularly, a subscriber, can be associated with the operation of a corresponding UE for one or more voice and/or data sessions. In various embodiments, a subscriber associated with a given UE can be identified using one or more identifiers such as, for example, an International Mobile Subscriber Identity (IMSI) or a Temporary IMSI (T-IMSI). An IMSI for a given subscriber is typically stored on a Subscriber Identity Module (SIM) (e.g., a SIM card) within the subscriber's UE.

In various embodiments, UE 112 can be associated with any users, subscribers, employees, clients, customers, electronic devices, etc. wishing to initiate a flow in communication system 100 via some network. In at least one embodiment, UE 112 is configured to facilitate simultaneous Wi-Fi connectivity and cellular connectivity within communication system 100. The terms 'user equipment', 'mobile node', 'mobile station' or 'mobile device' are inclusive of devices used to initiate a communication, such as a computer, an electronic device such as a parking meter, vending machine, appliance, etc., a personal digital assistant (PDA), a laptop or electronic notebook, a cellular telephone, an i-Phone™, i-Pad™, a Google Droid™ phone, an IP phone, wearable electronic device or any other device, component, element, or object capable of initiating voice, audio, video, media, or data exchanges within communication system 100. UE 112 may also be inclusive of a suitable interface to a human user such as a microphone, a display, a keyboard, or other terminal equipment.

UE 112 may also be any device that seeks to initiate a communication on behalf of another entity or element such as a program, a database, or any other component, device, element, or object capable of initiating an exchange within communication system 100. In certain embodiments, UE 112 may have a bundled subscription for network access and application services (e.g., voice), etc. In one embodiment, once the access session is established, the user can register for application services as well, without additional authentication requirements. Within communication system 100, IP addresses (e.g., for UE or any other element in communication system 100) can be assigned using dynamic host configuration protocol (DHCP), Stateless Address Auto-configuration (SLAAC), during default bearer activation processes, etc., or any suitable variation thereof. IP addresses used within communication system 100 can include IP version 4 (IPv4) and/or IP version 6 (IPv6) IP addresses.

Consider an operational example use case in which a handover is initiated for UE 112 from eNodeB 114a to eNodeB 114b. For the present example use case, eNodeB 114a can be considered the source eNodeB and eNodeB 114b can be considered the target eNodeB to receive handover of UE 112. In order to overcome the aforementioned problems involving verifying a count of packets forwarded from the source eNodeB to the target eNodeB, the source eNodeB can maintain: 1) for AM bearers, a count of PDCP PDUs and PDCP SDUs buffered per bearer level at the PDCP layer for UE 112 and 2) for UM bearers, a count of PDCP PDUs buffered per bearer level at the PDCP layer for UE 112. During handover of the UE to the target eNodeB, a given SGW (e.g., SGW 118) can send a GTPU End Marker Indication to the source eNodeB for each UE 112 bearer, which can mark the end of transmission for each UE 112 bearer at the source eNodeB.

In one embodiment, upon receiving a GTPU End Marker Indication message from a given SGW (e.g., SGW 118) for each UE 112 bearer at the source eNodeB, an End Marker Indication event can be triggered and the source eNodeB can generate a GTPU End Marker Indication message for each UE 112 bearer. Each corresponding End Marker Indication message for each UE 112 bearer can include a Private Extension Information Element (IE), which can include, at least in part, the count determined for each bearer (e.g., the AM bearers and/or the UM bearers for UE 112). The source eNodeB can send each End Marker Indication message that includes the Private Extension IE to the target eNodeB in each corresponding GTPU tunnel for each corresponding bearer. At the target eNodeB, the PDCP layer can compare the per bearer count received from the source eNodeB with a count of the forwarding packets it received on each corresponding bearer's forwarding tunnel to determine whether any forwarding packets for any bearer have been lost or delayed. In one embodiment, if any data has been lost for any UE bearer(s), an eNodeB can record the number of packets lost for the UE for any corresponding bearer(s). In another embodiment, an eNodeB can record and track the number of packets lost for certain UE bearer(s) across one or more UEs and/or one or more bearers to determine loss statistics (or any other statistics) that can be communicated to network operator. In yet another embodiment, if packets are lost for traffic requiring lossless handover, an alarm can be triggered at the target eNodeB and the target eNodeB can inform a network operator, service operator and/or administrator of the target eNodeB regarding the loss incurred during a lossless handover.

As discussed in further detail below, the Private Extension can be configured to carry other information and/or parameters in accordance with various embodiments of communication system 100.

Referring to FIG. 1C, FIG. 1C is a simplified schematic diagram illustrating an example GTPU End Marker Indication message 160 including a Private Extension Information Element (IE) 164 that can be used to carry a forwarding packet count for a given bearer in accordance with one potential embodiment of communication system 100. The GTPU End Marker Indication message is defined in 3GPP TS 29.281. As discussed herein, embodiments of the present disclosure can provide for the configuration of a Private Extension IE (e.g., Private Extension IE 164) that can include, at least in part, a count of packets forwarded from a source eNodeB to a target eNodeB for handover of a given UE to the target eNode. In some embodiments, a Private Extension IE can also be configured to carry other information such as traffic modeling or profiling information and/or parameters, bearer buffer information and/or parameters, RLC tuning parameters, VoLTE jitter buffer playout time, data path statistics, local gateway (LGW) information, combinations thereof or any other information and/or parameters.

The example GTPU End Marker Indication message 160 shown in FIG. 1C has a length of 17 octets in which the first eight (8) octets are the mandatory part for a GTPU header 162 and the remaining nine (9) octets carry information for the Private Extension IE 164. The minimum length of a GTPU header is eight (8) bytes.

The first octet of the GTPU End Marker Indication message 160 is a mandatory octet that includes: an N-PDU Number flag at bit 1, a Sequence Number flag (S) at bit 2, which is unused for the End Marker message type, an Extension Header flag at bit 3, bit 4 is an unused spare bit, a Protocol Type (PT) at bit 5 and a GTPU version number at bits 6-8. Because the Private Extension IE 164 is not an extension of the GTPU header 162, but rather is an optional IE of the GTPU End Marker Indication message 160, bit 3 of octet 1 can be set to zero (0). The decimal message type '254' carried in octet 2 corresponds to the End Marker message type, as defined in 3GPP TS 29.281, Section 6.1. As referred to herein, an End Marker message, as defined in 3GPP TS 29.281, can also be referred to as an 'End Marker Indication' message.

The total Length, in octets, of the GTPU End Marker Indication message 160 payload (e.g., the rest of the packet following the mandatory part of the GTPU header) is given by octet 3 and octet 4. For the example GTPU End Marker Indication message 160, value 0x0 in octet 3 and value 0x9 in octet 4 indicates that the total length of the Private Extension IE 164 is nine (9) octets. Octets 4-8 carry the tunnel identifier (ID), which corresponds to tunnel ID 0x00000002 as shown at Octet 8 for the example GTPU End Marker Indication message 160.

Octet 9 onwards carries information associated with the Private Extension IE 164. Value 255 in octet 9 indicates that the IE is a Private Extension field. Octets 10 and 11 provide the total payload length of the Private Extension field, in this example use case, value 0x0 in octet 10 and value 0x6 in octet 11 indicates that the payload length of the Private Extension IE 164 is six (6), which extends from octet 12 to octet 17. Octets 12 and 13 provide a Private Extension identifier 166 of the Private Extension IE 164. Value 0xB6 in octet 12 and 0x0E in octet 13 indicates that value 46606 is the Private Extension identifier 166 for the Private Extension IE 164. The value 46606 can be the extension identifier number for any Private Extension IE associated with embodiments of the present disclosure. This extension identifier number of 46606 has been acquired from the Internet Assigned Numbers Authority (IANA) for use with a Private Extension IE for an End Marker Indication message that can carry information and/or parameters associated with embodiments of the present disclosure.

Octets 14-17 provide Private Extension Values 168 for the Private Extension IE 164. In at least one embodiment, the Private Extension Values for a Private Extension IE for a GTPU End Marker Indication message (e.g., Private Extension IE 164) can be configured in a Tag, Length, Value (TLV) format. For a TLV format, the Tag field can represent the type of the additional information and/or parameters to be shared, the Length field can indicate the size of data associated with the Tag field and the Value field can contain a value (e.g., a forwarded packet count) to be shared with a target eNodeB. For the Private Extension IE 164, an extension Tag field 170 is carried in octet 14, extension Length fields 172 are carried in octets 15-16 and an extension Value field 174 is carried in octet 17.

In one embodiment, the extension Tag field 170 being set to 0x1 can be used to indicate that the Value field 174 for the TLV information and/or parameters can correspond to the count for the total number of packets forwarded from a given source eNodeB to a given target eNodeB; the extension Length fields 172 being set to 0x0 in octet 15 and 0x1 in octet 16 can indicate one byte in the Value field 174; and the extension Value field 174 being set to 0xa in octet 17 can indicate that there were 10 packets that were forwarded from the source eNodeB to the target eNodeB for GTP tunnel ID 0x00000002. It should be understood that the example GTPU End Marker Indication message shown in FIG. 1C illustrates only one example of the fields that can be added in the TLV format. It should be understood that any number of the fields can be added in the TLV format for data that is to be shared. In at least one embodiment, data can be shared in a Tag, Value (TV) format.

As an End Marker Indication message can be sent on a datagram network there is a possibility of the loss of this message. In such a scenario, data forwarding information can be lost and it may not be possible to determine the number of packets lost during data forwarding. In accordance with one embodiment, the system and method provided herein can provide for an alternative method for determining data loss, which can incorporate using the optional Sequence Number IE of the GTPU Header to determine whether loss during data forwarding has occurred. However, this alternative of using optional Sequence number IE field is that an additional four (4) octets of overhead will be added for every forwarding packet, which can add additional processing per forwarding packet by adding this field.

From 3GPP TS 29.281, Section 5.1, when the optional field Sequence Number is used for GTP encapsulated PDUs (GPDUs) (e.g., Transport PDUs (TPDUs) plus GTPU headers); an increasing sequence number for TPDUs is transmitted via GTPU tunnels when transmission order is to be preserved. For Supported Extension Headers Notification and Error Indication messages, the Sequence Number is ignored by the receiver, even though the S flag is set to '1'. Thus, the optional field Sequence Number field is required when transmission order is to be preserved. However, during LTE Handover procedures, data forwarding transmission order is already maintained using PDCP Sequence Number IE in forwarding packets.

In contrast, the solution of including the Private Extension IE as discussed for various embodiments described herein can be used to determine the reliability of an operator's network using the number of packets lost during handover with minimal overhead. With the Private Extension IE solution, an operator can be alerted if there are consistent losses observed during handover over within the operator's network in accordance with various embodiments. Even if an End Marker Indication (EMI) is lost for a few instances from other instances where an EMI is successfully received, the reliability of an operator's network can be determined using the system and method described herein.

Various operations that can be performed within communication system 100 can be further illustrated using various example interaction diagrams, which are provided herein below with reference to FIGS. 2A-2B and 3A-3B.

Figure 2B:
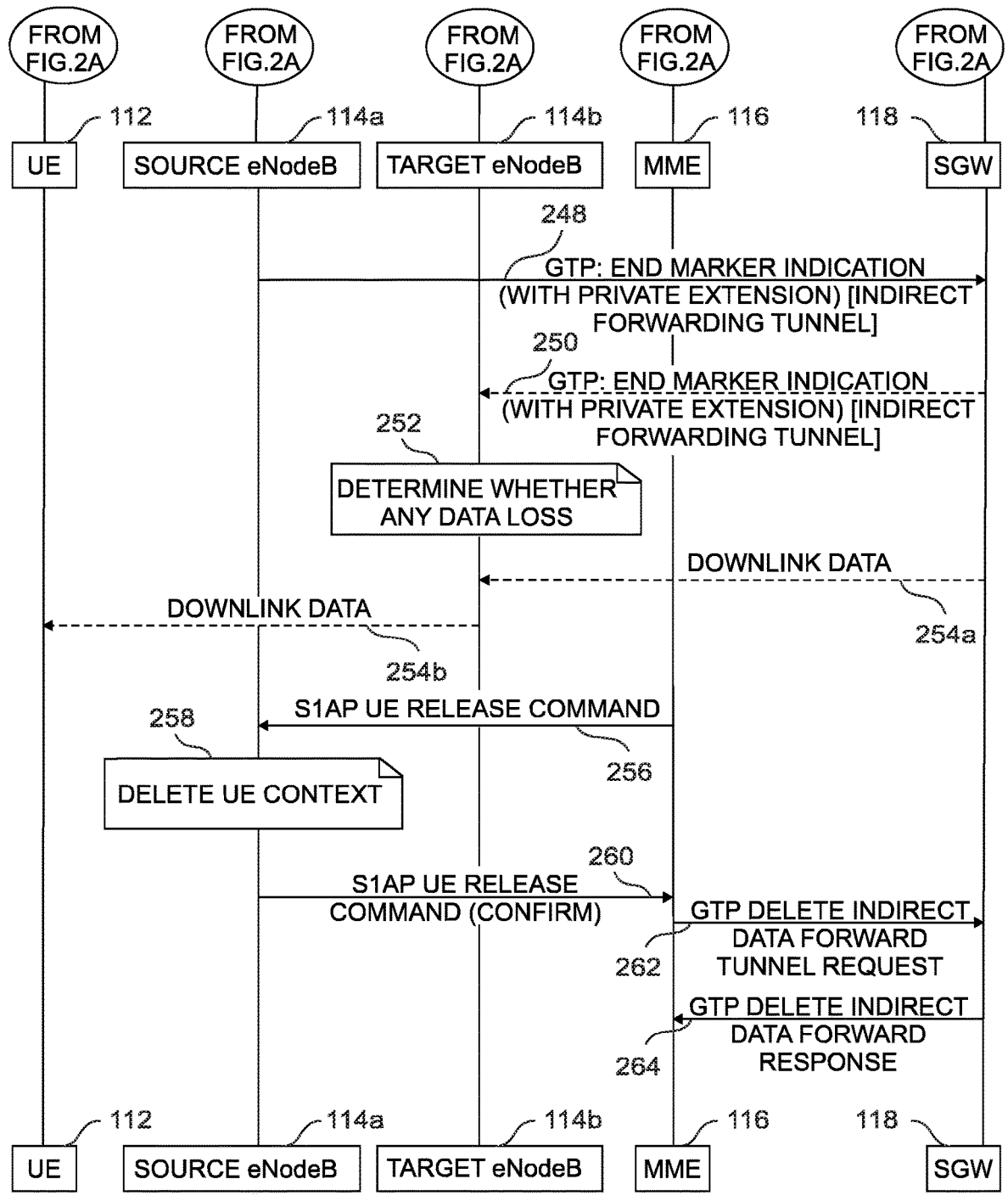

Turning to FIGS. 2A-2B, FIGS. 2A-2B are a simplified interaction diagram 200 illustrating example details that can be associated with sharing bearer information and/or parameters during an S1AP handover in network environment in accordance with one potential embodiment of communication system 100. The example details can be associated with an S1AP handover of UE 112 from a source eNodeB (e.g., eNodeB 114a) to a target eNodeB (e.g., eNodeB 114b); thus, FIGS. 2A-2B include UE 112, source eNodeB 114a, target eNodeB 114b, MME 116 and SGW 118.

Prior to the handover, downlink data from a PDN (e.g., PDN 130) is delivered to UE 112 at 202a, 202b via source eNodeB 114a. The source eNodeB 114a can set measurement thresholds for measurement reports sent by UE 112. At 204, UE 112 sends measurement reports including neighboring cell signal quality for a potential handover target eNodeB (e.g., target eNodeB 114b) once the cell signal quality for target eNodeB 114b increased beyond the threshold configured by the source eNodeB 114a. The source eNodeB 114a acts upon the measurement reports by performing Handover Decision and determining a target eNodeB (e.g., target eNodeB 114b) to which to handover the UE based on the measurement reports.

At 206, the source eNodeB sends an S1 Handover Required command to the MME 116. The command message can carry, among other things, characteristics of established bearers for UE 112 along with information indicating whether downlink forwarding (dl-forwarding) is enabled for the UE. For purposes of the embodiment shown in FIGS. 2A-2B, it is assumed that dl-forwarding is enabled for UE 112. In various embodiments, handover for a given UE can be configured through direct or indirect tunneling. In a case of direct tunneling, data packets are forwarded from a source eNodeB to a target eNodeB directly. On other hand if indirect tunneling is configured, packets are forwarded from a source eNodeB to a target eNodeB via the SGW. In a case of an S1 handover in which an X2 link is not present, indirect tunneling is typically the preferred method for forwarding downlink data to a target eNodeB.

At 208, the MME 116 sends a Handover Request message received from source eNodeB 114a to target eNodeB 114b, which creates the context for UE 112 at target eNodeB 114b. The target eNodeB 114b can check whether it has resources available to accept the handover request for UE 112 and, upon determining that resources are available, allocates dedicated radio resources for uplink and downlink communications with the UE, allocates a Random Access Channel (RACH) preamble to the UE, allocates a new Cell Radio Network Temporary Identifier (C-RNTI) to the UE and also creates GTP tunnel endpoint(s) for each UE 112 bearer(s) for delivering forwarding packets received from the source eNodeB 114a as well as for delivering downlink (DL) packets received from SGW 118 once UE 112 is identified in the target eNodeB 114b.

After successful allocation of the various resources for UE 112, the target eNodeB 114b sends an S1 Handover Request Acknowledge (Ack) to the MME 116 at 210. Among other things, this message can carry a Radio Resource Control (RRC) Handover Command, which can internally carry an RRC Connection Reconfiguration message in a transparent container as defined in 3GPP standards. Once the S1 Handover Request Ack is sent to MME 116, the target eNodeB 114b is prepared to receive data in forwarding tunnel(s).

At 212, the MME 116 requests the SGW 118 to create indirect forwarding tunnel(s) for each UE 112 bearer(s) in case the target eNodeB 114b is not reachable from the source eNodeB 114a (e.g., in case the X2 link is not set up). At 214, SGW 118 responds to the request indicating that indirect forwarding tunnel(s) have been created. Accordingly, downlink data can be forwarded from the source eNodeB to the target eNodeB using either direct forwarding tunnel(s) or using indirect forwarding tunnel(s); however, indirect tunneling is illustrated for the embodiment shown in FIGS. 2A-2B. At 216, MME 116 sends an S1 Handover Command message to the source eNodeB 114a to initiate sending RRC Connection Reconfiguration message, which was sent by the target eNodeB in the container within the RRC Handover Command. The RRC Connection Reconfiguration message is sent to UE 112 at 228.

In the meantime, any downlink data destined to UE 112 for any UE 112 bearer(s) can be sent from SGW 118 to source eNodeB 114a at 218. At 220, source eNodeB 114a can maintain a packet count of downlink data for any UE 112 bearer(s) forwarded to the target eNodeB 114b via SGW 118 at 222 using the indirect tunnel(s) established at 212-214. At 224, SGW 118 forwards the downlink data to the target eNodeB 114b. At 226, the target eNodeB 114b buffers the packets and begins to maintain a count of packets received from the source eNodeB 114a for any UE 112 bearer(s).

At 230 the source eNodeB 114a sends an S1 eNodeB Status Transfer message to the target eNodeB 114b via MME 116, which routs the message to the target eNodeB 114b at 232. The Status Transfer message includes a PDCP Sequence Number and a Hyper Frame Number (HFN) status that has to be restored at the target eNodeB. UE 112 uses assigned resources which were sent to it in the Handover Command (e.g., the RRC Connection Reconfiguration) and sends a Reconfiguration Complete message to the target eNodeB 114b at 234. Forwarded data received at the target eNodeB 114b from the source eNodeB 114a can now be sent to the UE, as shown at 238.

At 236, the target eNodeB 114b sends a S1AP Handover Notify message to MME 116 indicating the S1AP handover to target eNodeB 114b. At 240, MME 116 sends a GTP Modify Bearer Bequest to the SGW 118, which indicates to the SGW to delete the tunnel(s) towards source eNodeB for downlink packet transmission and to switch the data path from the source eNodeB to the target eNodeB 114b tunnel(s). GTP tunnel endpoint(s) for UE 112 bearer(s) were created and indicated for the target eNodeB 114b as part of Handover Request Acknowledge message, discussed above at 210. A GTP Modify Bearer Response is sent to the MME 116 at 242 indicating successful switch to the target eNodeB tunnel(s).

At 244, it is assumed that the SGW 118 sends, for each 112 bearer(s), a GTP End Marker Indication message to the source eNodeB 114a on each GTPU tunnel(s) after sending the last packet on each GTPU tunnel(s) towards source eNodeB 114a. The End Marker Indication message indicates to the source eNodeB 114a that there will be no more packets on the forwarding tunnel(s) and the tunnel(s) can be deleted. An End Marker Indication message sent from SGW 118 does not include the Private Extension IE. Any downlink data destined for UE 112 can now forwarded to the target eNodeB 114b as shown at 254a, 254b.

Receiving an End Marker Indication message(s) at the source eNodeB 114a can trigger an End Marker Indication event at 246 in which the source eNodeB determines a forwarded packet count for each UE 112 bearer(s) and configures a GTPU End Marker Indication (EMI) message including a Private Extension IE containing, at least in part, the forwarded packet count for each UE 112 bearer(s). The determination of the forwarded packet count can be determined after any packets buffered at the source eNodeB have been forwarded toward the target eNodeB. Continuing to FIG. 2B, at 248, the source eNodeB 114a sends the GTPU EMI message(s), each including its configured Private Extension IE for each UE 112 bearer(s), to the SGW 118 via the indirect tunnel(s). At 250, the SGW 118 forwards the GTPU EMI message(s) to the target eNodeB 114b.

At 252, the target eNodeB 114b determines, based on a comparison between the packet count(s) maintained at the target eNodeB for each UE 112 bearer(s) and the packet count(s) received in the Private Extension IE for each bearer(s), whether any data that was forwarded from the source eNodeB 114a has been lost for any UE 112 bearer(s).

In one embodiment, if any data has been lost for any UE bearer(s), an eNodeB can record the number of packets lost for the UE for any corresponding bearer(s). In another embodiment, an eNodeB can record and track the number of packets lost for certain UE bearer(s) across one or more UEs and/or one or more bearers to determine loss statistics (or any other statistics) that can be communicated to network operator. In yet another embodiment, if packets are lost for traffic requiring lossless handover, an alarm can be triggered at the target eNodeB and the target eNodeB can inform a network operator, service operator and/or administrator of the target eNodeB regarding the loss incurred during a lossless handover.

At 256, the MME 116, after expiry of a Handover Release Timer, sends an S1AP UE Context Release command to the source eNodeB 114a. At 258, the source eNodeB 114a deletes any context for UE 112 and responds with a UE Context Release Confirmation message to the MME 116 at 260. At 262, the MME 116 instructs the SGW 118 to delete any forwarding tunnel(s) associated with the source eNodeB 114a and the MME responds to the SGW once any forwarding tunnel(s) are deleted at 264. Thus, as shown in the embodiment of FIGS. 2A-2B, bearer information and/or parameters can be shared with a target eNodeB via indirect tunneling during an S1AP handover in accordance with one potential embodiment of communication system 100.

Figure 3B:
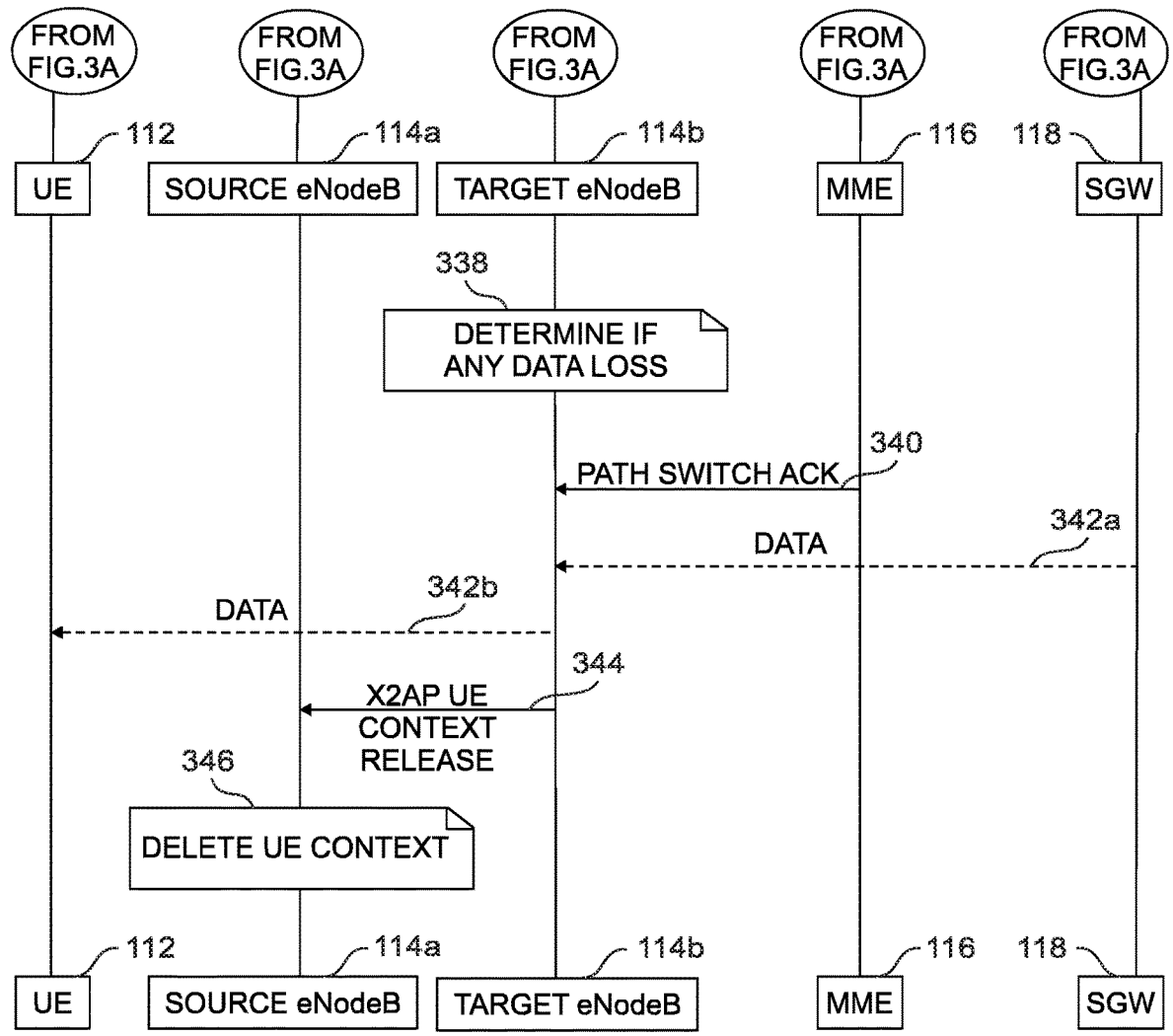

Turning to FIGS. 3A-3B, FIGS. 3A-3B are a simplified interaction diagram 300 illustrating example details that can be associated with sharing bearer information and/or parameters during an X2 handover in network environment in accordance with one potential embodiment of communication system 100. The example details can be associated with an X2 handover of UE 112 from a source eNodeB (e.g., eNodeB 114a) to a target eNodeB (e.g., eNodeB 114b); thus, FIGS. 3A-3B includes UE 112, source eNodeB 114a, target eNodeB 114b, MME 116 and SGW 118 and assumes an X2 interface is configured, which interconnects the source eNodeB and the target eNodeB.

Prior to the handover, downlink data from a PDN (e.g., PDN 130) is delivered to UE 112 at 302a, 302b via source eNodeB 114a. The source eNodeB 114a can set measurement thresholds for measurement reports sent by UE 112. At 304, UE 112 sends measurement reports including neighboring cell signal quality for a potential handover target eNodeB (e.g., target eNodeB 114b) once the cell signal quality for target eNodeB 114b increased beyond the threshold configured by the source eNodeB 114a. The source eNodeB 114a acts upon the measurement reports, by performing a Handover Decision and determining a target eNodeB (e.g., target eNodeB 114b) to which to handover the UE based on the measurement reports.

At 306, the source eNodeB sends an X2AP Handover Request message to the target eNodeB 114b. The X2 interface configured between the source eNodeB 114a and the target eNodeB 114b can be configured with direct Stream Control Transmission Protocol (SCTP) tunnels to facilitate communications between the source and the target eNodeB. For purposes of the embodiment shown in FIGS. 3A-3B, it is assumed that dl-forwarding is enabled for UE 112.

Upon receiving the X2AP Handover Request, the target eNodeB 114b can check whether it has resources available to accept the handover request and, upon determining that resources are available, allocates dedicated radio resources for uplink and downlink communications with the UE, allocates a RACH preamble to the UE, allocates a new C-RNTI to the UE and also creates GTP tunnel endpoint(s) for each UE 112 bearer(s) for delivering forwarding packets received from the source eNodeB 114a as well as for delivering DL packets received from SGW 118 once UE 112 is identified in the target eNodeB 114b.

After successful allocation of the various resources for UE 112, the target eNodeB 114b responds with an X2AP Handover Request Acknowledge message sent to the source eNodeB 114a at 308. Among other things, this message can carry an RRC Connection Reconfiguration message in a transparent container message. Once the X2AP Handover Request Ack is sent to the source eNodeB 114a, the target eNodeB 114b is prepared to receive data in forwarding tunnel(s). GTPU direct forwarding tunnel(s) for each UE 112 bearer(s) are established between the source and the target eNodeB.

As shown at 310, any downlink data destined to UE 112 for any UE 112 bearer(s) can be sent from SGW 118 to source eNodeB 114a. At 312, source eNodeB 114a can maintain a packet count of any downlink data for any UE 112 bearer(s) forwarded to the target eNodeB 114b at 314. At 316, the target eNodeB 114b buffers the packets and begins to maintain a count of packets received from the source eNodeB 114a for any UE 112 bearer(s).

To continue the handover to the target eNodeB 114b, the source eNodeB 114a sends the RRC Connection Reconfiguration message to UE 112 at 318. At 320, the source eNodeB 114a sends an X2AP Sequence Number (SN) Status Transfer message to the target eNodeB 114b. The Status Transfer message includes a PDCP Sequence Number and a HFN status that has to be restored at the target eNodeB. Upon receiving the RRC Connection Reconfiguration message, UE 112 transitions into an IDLE mode and tries to establish a connection with the target eNodeB 114b using the resources allocated at the target eNodeB and sent to the UE via the RRC Connection Reconfiguration message. It is assumed that a connection is established with the target eNodeB and the UE 112 the UE sends an RRC Connection Reconfiguration complete message to the target eNodeB 114b at 322. Forwarded data received at the target eNodeB 114b from the source eNodeB 114a can now be sent to the UE, as shown at 324.

At 326, the target eNodeB 114b sends an S1AP Path Switch Request to the MME 116 indicating to MME 116 the X2AP handover to target eNodeB 114b. At 328, the MME 116 sends a GTP Modify Bearer Request to the SGW 118. Among other things, this message can include information of GTP tunnel endpoint(s) which the target eNodeB 114 created for all UE 112 bearer(s) for transferring downlink packets to the UE 112.

At 330, it is assumed that the SGW 118 sends, for each UE 112 bearer(s), a GTP End Marker Indication message to the source eNodeB 114a on each GTPU tunnel(s) after sending the last packet on each GTPU tunnel(s) toward the source eNodeB 114a. The End Marker Indication message indicates to the source eNodeB 114a that there will be no more packets on the forwarding tunnel(s) and the tunnel(s) can be deleted. End Marker Indication message(s) sent from SGW 118 at 330 do not include the Private Extension IE. Any downlink data destined for UE 112 can now forwarded to the target eNodeB 114b as shown at 342a, 342b.

Receiving an End Marker Indication message(s) at the source eNodeB 114a can trigger an End Marker Indication event at 334 in which the source eNodeB determines a forwarded packet count for each UE 112 bearer(s) and configures a GTPU End Marker Indication (EMI) message including a Private Extension IE containing, at least in part, the forwarded packet count for each UE 112 bearer(s). The determination of the forwarded packet count can be determined after any packets buffered at the source eNodeB have been forwarded toward the target eNodeB. At 336, the source eNodeB 114a sends the GTPU EMI message(s), each including its configured Private Extension IE for each UE 112 bearer(s), to the target eNodeB 114b.

Continuing to FIG. 3B, upon receiving the GTPU EMI message(s), the target eNodeB 114b can determine at 338, based on a comparison between the packet count(s) maintained at the target eNodeB for each bearer(s) and the packet count(s) received in the Private Extension IE for each bearer(s), whether any data that was forwarded from the source eNodeB 114a has been lost for any UE 112 bearer(s).

In one embodiment, if any data has been lost for any UE bearer(s), an eNodeB can record the number of packets lost for the UE for any corresponding bearer(s). In another embodiment, an eNodeB can record and track the number of packets lost for certain UE bearer(s) across one or more UEs and/or one or more bearers to determine loss statistics (or any other statistics) that can be communicated to network operator. In yet another embodiment, if packets are lost for traffic requiring lossless handover, an alarm can be triggered at the target eNodeB and the target eNodeB can inform a network operator, service operator and/or administrator of the target eNodeB regarding the loss incurred during a lossless handover.

Meanwhile, the MME 116 can receive a Modify bearer response from the SGW 118 at 332 and can send an S1AP Path Switch Request Acknowledgment (ACK) message to the target eNodeB at 340, which indicates the completion of the Path Switch at the SGW 118. Additionally upon receiving the GTPU End Marker Indication message(s), the target eNodeB 114b can send an X2AP UE Context Release message to the source eNodeB 114a at 344. At 346, the source eNodeB 114a deletes any context for UE 112. Thus, as shown in the embodiment of FIGS. 3A-3B, bearer information and/or parameters can be shared with a target eNodeB via direct tunneling during an X2 handover in accordance with one potential embodiment of communication system 100.

Referring to FIG. 4, FIG. 4 is a simplified schematic diagram illustrating another example GTPU End Marker Indication message 400 including a Private Extension IE 404 that can be used to carry a forwarding packet count and RLC tuning parameters for a given UE bearer in accordance with one potential embodiment of communication system 100. As discussed previously, a Private Extension IE can be configured to carry a forwarded packet count and can also be configured to carry other information such as data traffic profiling or modeling information and/or parameters, bearer buffer information and/or parameters, RLC tuning parameters, VoLTE jitter buffer playout time, data path statistics, local gateway (LGW) information, combinations thereof or any other information and/or parameters in accordance with various embodiments. Thus, in various embodiments, key information and/or parameters can be shared with peer eNodeBs without disrupting ongoing traffic, operations and/or timing at which information and/or parameters are shared with peer eNodeBs without loss of the information and/or parameters.

In at least one embodiment, RLC parameters tuned at a source eNodeB can be sent from the source eNodeB to a target eNodeB during handover in addition to a count of packets forwarded to the target eNodeB. In general, RLC parameters at an RLC peer can be tuned to provide dynamic adaptation for over-the-air traffic between RLC peers, which can reduce the number of RLC Acks sent over-the-air between the peers. By reducing the number of RLC Acks, a considerable number of control plane RLC packets can be reduced thereby enhancing overall over-the-air data traffic between peers.

In one embodiment, an AM RLC entity (e.g., a given eNodeB) can poll its peer AM RLC entity (e.g., a UE) in order to trigger status reporting at the peer AM RLC entity. To facilitate dynamic adaptation to over-the-air traffic, RLC AM mode parameters such as, for example, poll byte (PollByte), poll PDU (PollPDU) and poll interval (T-StatusProhibit) as defined in 3GPP TS 36.322 and 36.331 can be computed at run time by a peer RLC entity to set a poll bit in an RLC AM PDU, which can reduce the number of RLC Acks sent over-the-air between RLC AM peers.

The example GTPU End Marker Indication message 400 shown in FIG. 4 has a length of 23 octets in which the first eight (8) octets are the mandatory part for a GTPU header 402 and the remaining 15 octets carry information for the Private Extension IE 404. The first octet of the GTPU End Marker Indication message 400 is the mandatory octet that includes: an N-PDU Number flag at bit 1, a Sequence Number flag (S) at bit 2, which is unused for the End Marker message type, an Extension Header flag at bit 3, bit 4 is an unused spare bit, a Protocol Type (PT) at bit 5 and a GTPU version number at bits 6-8. The decimal message type '254' carried in octet 2 corresponds to the End Marker message type, as defined in 3GPP TS 29.281, Section 6.1.

The total Length, in octets, of the GTPU End Marker Indication message 400 payload (e.g., the rest of the packet following the mandatory part of the GTPU header) is given by octet 3 and octet 4. For the example GTPU End Marker Indication message 400, value 0x0 in octet 3 and value 0xf in octet 4 indicates that the total length of the Private Extension IE is 15 octets. Octets 4-8 carry the tunnel ID, which corresponds to tunnel ID 0x00000002 as shown at Octet 8 for the example GTPU End Marker Indication message 400.

Octet 9 onwards carries information associated with the Private Extension IE 404. Value 255 in octet 9 indicates that the IE is a Private Extension field. Octets 10 and 11 provide the total payload length of the Private Extension field, in this example use case, value 0x0 in octet 10 and value 0xc in octet 11 indicates that the payload length of the Private Extension IE 404 is 12, which extends from octet 12 to octet 23. Octets 12 and 13 provide a Private Extension identifier 406 for the Private Extension IE 404. Value 0xB6 in octet 12 and 0x0E in octet 13 indicates that value 46606 is the Private Extension identifier 406 for the Private Extension IE 404. The value 46606 can be the extension identifier number for any Private Extension IE associated with embodiments of the present disclosure. As noted previously, the extension identifier number of 46606 has been acquired from IANA for use with a Private Extension IE for an End Marker Indication message that can carry information and/or parameters associated with embodiments of the present disclosure.

Octets 14-17 provide Private Extension Values 408 for a total forwarded packet count configured for the Private Extension IE 404. In at least one embodiment, as discussed herein, the Private Extension Values for the forwarded packet count can be configured in a TLV format. For the total forwarded packet count included in the Private Extension IE 404, the Tag field is carried in octet 14, the Length field is carried in octets 15-16 and the Value field is carried in octet 17. The Tag field for the forward packet count is set to 0x1 to indicate that the Value field for the TLV information corresponds to the count for the total number of packets forwarded from a given source eNodeB to a given target eNodeB; the Length field is set to 0x0 in Octet 15 and 0x1 in Octet 16 to indicate one byte in the Value field; and the Value field is set to 0xa in Octet 17 to indicate that there were 10 packets that were forwarded from the source eNodeB to the target eNodeB for GTP tunnel ID 0x00000002.

Along with the total forwarded count information, RLC tuning parameters are also configured for the Private Extension IE 404 at Private Extension Values 410 in a TLV format. An extension Tag field 412 for the RLC tuning parameters is carried in octet 18; extension Length Fields are carried at octets 19 and 20; and respective extension Value fields 416, 418 and 420 are carried in respective octets 21, 22 and 23. In one embodiment, the extension Tag field 412 at octet 18 being set to a value 0x4 can be used to indicate that the TLV information and/or parameters can correspond to RLC tuning parameters computed at a given source eNodeB; the extension Length fields 414 being set to 0x0 and 0x3 can indicate 3 bytes of information and/or parameters. The first byte at extension Value field 416 represents pollPDU, the second byte at extension Value field 418 represents pollByte and the third byte at extension Value field 420 represents the polling interval for the RLC tuning parameters computed at the source eNodeB.

Thus, as shown in FIG. 4, a Private Extension IE for a GTPU End Marker Indication message can be configured to carry any information and/or parameters as desired by a network operator. In addition to sharing RLC tuning parameters, sharing traffic flow information can play an important role in LTE architectures, especially through sharing proprietary information from a source cell radio to a target cell radio during handover procedures. During mobility events (e.g., handover), for example, a target eNodeB may desire to learn the configuration parameters and/or other information which a source eNodeB has already computed over a period of time instead of re-computing the information and/or parameters using data traffic analytics at the target eNodeB following various mobility events, which can reduce the learning period at the target eNodeB. In accordance with various embodiments, the solution provided by communication system 100 can be applied to various use cases in which sharing proprietary information over EMI provides various advantages including, but not limited to: profiling or modeling data traffic, dynamic buffer management, VoLTE jitter buffer playout time, data traffic profiling, data path statistics, local gateway (LGW) information, combinations thereof or any other information and/or parameters in accordance with various embodiments.

Each radio bearer for a given UE (e.g., UE 112) typically has a different buffer requirement. Ideally, the buffer requirement of a radio bearer is defined by the QCI and priority of the radio bearer. But this theoretical requirement may not exactly match a runtime requirement. For example, a practical observation is that the runtime requirement might be much less than the one which was decided during bearer entry. Along with knowing the total floating buffer required an eNodeB is also typically needs to know the packet size (e.g., min, max and average packet size) to feed a dynamic buffer management algorithm. In accordance with one potential embodiment, the runtime total buffer (e.g., min, max, average) required along with packet size (e.g., min, max and average) can be piggybacked over EMI messaging using the solution described herein by configuring a Private Extension IE with such information and/or parameters. In various embodiments, this can be specifically advantageous when defining a VoLTE bearer and/or a data bearer. Further, with prevailing usage of non-IMS (IP Multimedia System) based Voice Based applications, voice packets are mapped over a QCI 8 bearer instead of a QCI 1 bearer that inherently has low buffer requirement. Using piggybacked information and/or parameters as described herein, a target eNodeB can receive bearer information and/or parameters to provide buffer management for certain bearers.

In cases involving a VoLTE bearer, playout time of the last packet of the VoLTE bearer in the downlink at a dejitter buffer can also be included in EMI piggybacking in accordance with at least one potential embodiment. In a handover scenario, VoLTE packets which are forwarded might exceed a delay jitter requirement for such packets but a target eNode, which might be unaware about the delay jitter, might forward such packets to a given UE rather than discarding the packets at the dejitter buffer of the target eNodeB. In one embodiment, by sharing the Real-time Transport Protocol (RTP) playout time with a target eNodeB, the target eNodeB can be aware of any packets which have exceed the voice/video jitter delay requirement and can discard them.

A similar technique can be applied to uplink (UL) packets in at least one embodiment by sharing an UL packet arrival time of the last VoLTE packet received in the uplink from a given UE. In various embodiments, EMI piggybacking of information and/or parameters associated with VoLTE bearers can reduce overhead of redundant VoLTE packets without loss of quality during handover and once a VoLTE bearer is known, RTP characteristics can be deduced without decoding the RTP packets thereby reducing processing overhead at a given target eNodeB.

In accordance with various embodiments, the system and method provided by communication system 100 can also be applied to various applications including, but not limited to: data traffic profiling algorithms at a given eNodeB being fed information about the history of the data traffic for the bearers which are handed in from another eNodeB; aiding in determining data path statistics (e.g., by detecting losses occurring during a lossless handover, the system and method described herein can help an operator to collect data statistics); and/or sharing LGW information in case of Local IP access.

Accordingly, the system and method provided can provide a platform for sharing various traffic profile information and/or parameters with a target eNodeB in accordance with various potential embodiments. The information and parameters associated with data traffic can be shared during handover from source eNodeB to target eNodeB. Further, the system and method described herein can provide a solution for detecting/determining losses, if any are present, in forwarded packets during seamless and/or lossless handover from a source eNodeB to a target eNodeB in accordance with at least one potential embodiment. Additionally, the system and method described herein can also be used define proprietary mechanism for sending traffic model related parameters such as packet delay budget, packet delay, packet arrival rate, etc. from a source eNodeB to a target eNodeB in an effective and efficient manner in accordance with one potential embodiment.

Further, in various embodiments, the system and method described herein can provide various advantages. For example, the system and method provided by communication system 100 follows 3GPP standards and no additional requirements are needed in the standards to support the system and method; hence, no modifications to existing 3GPP standards are needed to implement the solution described herein. Further, by enabling sharing of critical Data path parameters (e.g., Mean Packet Delay, Packet Arrival Variance (for both UE and network packets)) during handover from a source eNodeB to a target eNodeB; as part of standard signaling procedures there is no provision to send the above mentioned parameters to target eNodeB for data processing. Additionally, by enabling sending various parameters to a target eNodeB, the target eNodeB can start with a guidance value received from the source eNodeB and can obtain a traffic model history of a given bearer. The source eNodeB deduces these parameters over a period of time, thus the target eNodeB need not again compute these parameters which would take another period of time, which can improve the performance of femto cells with respect to computation time.

Moreover, there is no Key Performance Indicator (KPI) defined in 3GPP standards to capture the number of packets forwarded from a source eNodeB to a target eNodeB and/or to capture the number of packets received at a target eNodeB from a source eNodeB. The system and method discussed for various embodiments described herein can provide stakeholders (e.g., equipment manufacturers, network operators, field engineers, etc.) key information about the number of packets lost, if any, during lossless or seamless handover procedures, which can enable the stakeholders to take necessary action in case losses are observed. In particular, the loss of data during handover can hinder TCP throttling. Using the system and described herein, any TCP degradation can be detected during handover.

In addition, a GTPU End Marker Indication can be carefully chosen to carry information and/or parameters to mark the end of data transmission over a given bearer in accordance with various embodiments described herein. This is advantageous to capture a complete data profile for a given bearer. In current cases involving S1 signaling for handover procedures, there is currently no container which can be transferred to a target eNodeB after SGW switches the data path. In cases involving X2 signaling for Handover procedures, an X2 Release indication is triggered after an SGW data path switch but in current deployments there exists no means to carry information and/or parameters. Thus, configuring a Private Extension IE for a GTPU End Marker Indication message, as discussed for various embodiments described herein, provides a viable solution to meet system constraints, thereby providing a key distinction compared any other solutions that may exist. Finally, the system and method discussed for various embodiments described herein can help a target eNodeB to adapt faster to the traffic model for hand-in calls at the target eNodeB.

Figure 5:
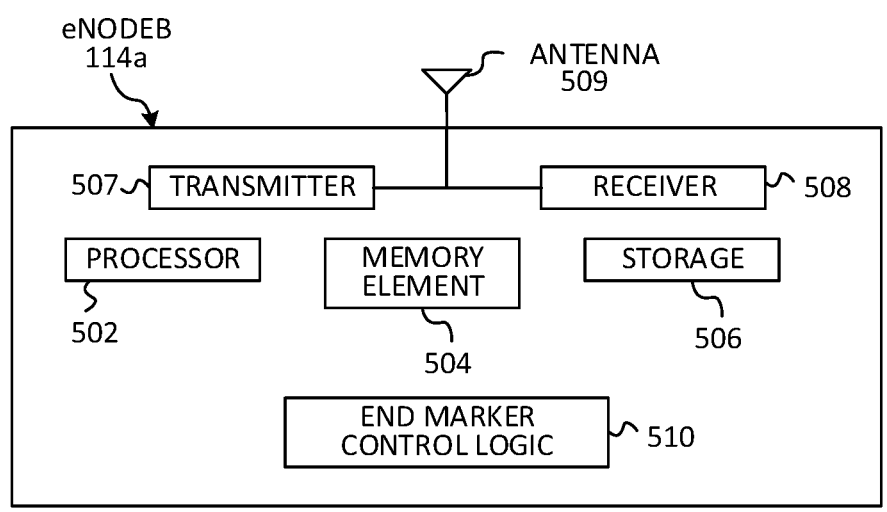
FIG. 5 is a simplified block diagram illustrating example details that can be associated with one potential embodiment of the communication system.

Turning to FIG. 5, FIG. 5 is simplified block diagram illustrating example details that can be associated with eNodeB 114*a* or any other eNodeB (e.g., eNodeB 114*b*, eNodeB 114*c*) or cell radio that may be deployed in communication system 100. Although not shown in FIG. 5, it should be understood that any, UE, element, node, service, server, etc. as described herein can be configured with various interfaces to facilitate various messaging and operations as described herein.

As shown in FIG. 5, eNodeB 114*a* can include at least one processor 502, at least one memory element 504, a storage 506, at least one transmitter 507, at least one receiver 508, at least one antenna 509 and an end marker control logic 510. In at least one embodiment, at least one processor 502 is at least one hardware processor configured to execute various tasks, operations and/or functions of eNodeB 114*a* as described herein and at least one memory element 504 is configured to store data associated with eNodeB 114*a*. In various embodiments, storage 506 for eNodeB 114*a* can be configured to store information and/or parameters associated with various operations as described herein including, but not limited to, tunnel endpoint identifiers, bearer information, handover information (e.g., type, etc.), a count of packets for one or more UE bearer(s), GTPU End Marker Indication configuration information, Private Extension IE configuration information, combinations thereof or the like as described for various embodiments described herein. In at least one embodiment, at least one transmitter 507, at least one receiver 508 and at least one antenna 509 can operate in combination and/or with one or more other elements of eNodeB 114*a* to facilitate over-the-air communications with one or more UE for various operations as described herein.

In various embodiments, end marker control logic 510 can be configured to perform one or more operations including, but not limited to: maintaining a count of packets forwarded to a given target eNodeB for handover of a given UE to the target eNodeB for one or more bearer(s) of the UE (e.g., if eNodeB 114*a* is the source eNodeB for the handover); maintaining a count of packets received from a given source eNodeB for handover of a given UE to the eNodeB 114*a* (e.g., if eNodeB 114*a* is the source eNodeB for the handover); triggering configuration of a GTPU End Marker message including a Private Extension IE including, at least in part, a count of forwarded packets for a given UE bearer (e.g., if eNodeB 114*a* is the source eNodeB for a handover) upon receiving an End Marker message from an SGW; comparing a count of packets for a UE bearer forwarded to the eNodeB from a source eNodeB to a count of packets received at the eNodeB (e.g., if eNodeB 114*a* is the target eNodeB for a handover); configuring a Private Extension IE for a GTPU End Marker message to include other information and/or parameters as discussed for various embodiments described herein, combinations thereof or the like as described for various embodiments described herein.

In regards to the internal structure associated with communication system 100, additionally each of respective UE 112, eNodeB 114*b*, eNodeB 114*c*, MME 116, SGW 118 and PGW 120 may each also include a respective at least one processor, a respective at least one memory element and/or a respective at least one respective storage. Further, each respective eNodeB 114*b* and eNodeB 114*c* may each additionally include a respective at least one transmitter, a respective at least one receiver and a respective at least one antenna. Hence, appropriate software, hardware and/or algorithms are being provisioned in eNodeBs 114*a*-114*c*, MME 116, SGW 118 and PGW 120 in order to facilitate operations as described for various embodiments discussed herein to facilitate sharing of information and/or parameters between a source eNodeB and a target eNodeB during handover of a given UE from the source eNodeB to the target eNodeB. Note that in certain examples, certain databases or storage (e.g., for storing information associated with bearer information and/or parameter sharing operations) can be consolidated with memory elements (or vice versa), or the storage can overlap/exist in any other suitable manner.

In one example implementation, eNodeBs 114a-114c, MME 116, SGW 118 and/or PGW 120 are network elements, which are meant to encompass network appliances, servers, routers, switches, gateways, bridges, loadbalancers, firewalls, processors, modules, or any other suitable device, component, element, or object operable to exchange information that facilitates or otherwise helps to facilitate various bearer information and/or parameter sharing operations as described for various embodiments discussed herein in a network environment (e.g., for networks such as those illustrated in FIG. 1). In other embodiments, these operations and/or features may be provided external to these elements, or included in some other network device to achieve this intended functionality. Alternatively, one or more of these elements can include software (or reciprocating software) that can coordinate in order to achieve the bearer information and/or parameter sharing operations and/or features, as outlined herein. In still other embodiments, one or more of these elements may include any suitable algorithms, hardware, software, components, modules, interfaces, or objects that facilitate the operations thereof. This may be inclusive of appropriate algorithms, communication protocols, interfaces and/or standards, proprietary and/or non-proprietary that allow for the effective exchange of data or information.

In various embodiments, eNodeBs 114a-114c, MME 116, SGW 118 and/or PGW 120 may keep information in any suitable memory element [e.g., random access memory (RAM), read only memory (ROM), an erasable programmable read only memory (EPROM), application specific integrated circuit (ASIC), etc.], software, hardware, or in any other suitable component, device, element, or object where appropriate and based on particular needs. Any of the memory items discussed herein should be construed as being encompassed within the broad term 'memory element'. Information being tracked or sent to UE 112, eNodeBs 114a-114c, MME 116, SGW 118 and/or PGW 120 could be provided in any database, register, control list, cache, or storage structure: all of which can be referenced at any suitable timeframe. Any such storage options may be included within the broad term 'memory element' as used herein. Similarly, any of the potential processing elements, modules, controllers, logic and/or machines described herein should be construed as being encompassed within the broad term 'processor'. Each of the network elements and/or user equipment can also include suitable interfaces for receiving, transmitting, and/or otherwise communicating data or information in a network environment.

Note that in certain example implementations, the bearer information and/or parameter sharing operations as outlined herein may be implemented by logic encoded in one or more tangible media, which may be inclusive of non-transitory media (e.g., embedded logic provided in an ASIC, in digital signal processing (DSP) instructions, software [potentially inclusive of object code and source code] to be executed by a processor or other similar machine, etc.). In some of these instances, a memory element [as shown in FIG. 5] can store data used for the operations described herein. This includes memory elements being able to store software, logic, code, or processor instructions that are executed to carry out the activities described herein. A processor (e.g., a hardware processor) can execute any type of instructions associated with data to achieve the operations detailed herein. In one example, a processor [as shown in FIG. 5] could transform an element or an article (e.g., data, information) from one state or thing to another state or thing. In another example, the activities outlined herein may be implemented with logic, which can include fixed logic, programmable logic, digital logic, etc. (e.g., software/computer instructions executed by a processor) and the elements identified herein could be some type of a programmable processor, programmable digital logic (e.g., a field programmable gate array (FPGA), a DSP processor, an EPROM, a controller, an electrically erasable PROM (EEPROM) or an ASIC that includes digital logic, software, code, electronic instructions, or any suitable combination thereof.

Note that in this Specification, references to various features (e.g., elements, structures, modules, components, steps, operations, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, controller, function, logic or the like as used herein this Specification, can be inclusive of an executable file comprising instructions that can be understood and processed on a computer, processor, combinations thereof or the like and may further include library modules loaded during execution, object files, system files, hardware logic, software logic, or any other executable modules.

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Note that with the examples provided above, as well as numerous other examples provided herein, interaction may be described in terms of one, two, three, or four network elements. However, this has been done for purposes of clarity and example only. In certain cases, it may be easier to describe one or more of the functionalities by only referencing a limited number of network elements. It should be appreciated that communication system 100 (and its teachings) are readily scalable and can accommodate a large number of components, as well as more complicated/sophisticated arrangements and configurations. Accordingly, the examples provided should not limit the scope or inhibit the broad teachings of communication system 100 as potentially applied to a myriad of other architectures.

As used herein, unless expressly stated to the contrary, use of the phrase 'at least one of', 'one or more of' and 'and/or' are open ended expressions that are both conjunctive and disjunctive in operation for any combination of named elements, conditions, or activities. For example, each of the expressions 'at least one of X, Y and Z', 'at least one of X, Y or Z', 'one or more of X, Y and Z', 'one or more of X, Y or Z' and 'A, B and/or C' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular nouns (e.g., element, condition, module, activity, operation, etc.) they modify. Unless expressly stated to the contrary, the use of these terms is not intended to indicate any type of order, rank, importance, temporal sequence, or hierarchy of the modified noun. For example, 'first X' and 'second X' are intended to designate two X elements that are not necessarily limited by any order, rank, importance, temporal sequence, or hierarchy of the two elements.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access, interfaces and protocols, communication system 100 may be applicable to other exchanges or routing protocols, interfaces and/or communications standards, proprietary and/or non-proprietary. Moreover, although communication system 100 has been illustrated with reference to particular elements and operations that facilitate the communication process, these elements, and operations may be replaced by any suitable architecture or process that achieves the intended functionality of communication system 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. Section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
    maintaining a first count of packets received by a target evolved Node B (eNodeB) that are forwarded from a source eNodeB during a handover of a user equipment (UE) from the source eNodeB to the target eNodeB;
    receiving a second end marker indication message communicated from the source eNodeB to the target eNodeB, wherein the second end marker indication message includes, in a Private Extension Information Element (IE), a second count of packets transmitted by the source eNodeB for the target eNodeB upon handover of the UE to the target eNodeB, wherein the source eNodeB is configured to receive a first end marker indication message, and in response, generate the second end marker indication message and transmit the second end marker indication message to the target eNodeB;
    parsing the Private Extension IE in the second end marker indication to recover the second count of packets; and
    comparing the second count of packets and the first count of packets, and in response determining that data has been lost during the handover and in response at least one of: (i) recording information related to the lost data, the recorded information suitable for use in generating loss statistics, or (ii) triggering an alarm at the target eNodeB related to the lost data.

2. The method of claim 1, wherein maintaining the count of packets includes maintaining a count of packets for each bearer of the UE and wherein a separate end marker indication message is communicated to the target eNodeB for each bearer of the UE using a separate tunnel established for each bearer of the UE.

3. The method of claim 1, wherein each tunnel is a General Packet Radio Service (GPRS) Tunneling Protocol (GTP) user data plane (GTPU) tunnel.

4. The method of claim 1, wherein the Private Extension IE includes an extension identifier having a value of 46606.

5. The method of claim 1, wherein the count of packets provided in the Private Extension IE is configured in a Tag, Length, Value (TLV) format.

6. The method of claim 1, further comprising: determining Radio Link Control (RLC) tuning parameters at the source eNodeB.

7. The method of claim 6, wherein the RLC tuning parameters are included in the Private Extension IE along with the count of packets.

8. The method of claim 1, wherein the source eNodeB is configured to receive the first end marker indication message from a serving gateway (SGW).

9. The method of claim 1, wherein the source eNodeB is further configured to include at least one traffic model parameter related to the UE in the Private Extension IE of the second end marker indication, the method further comprising:
    parsing the Private Extension IE in the second end marker indication to recover the traffic model parameter for the target eNodeB.

10. The method of claim 9, wherein the traffic model parameter comprises at least one of packet delay budget, packet delay, or packet arrival rate.

11. One or more non-transitory tangible media encoding logic that includes instructions for execution that when executed by a processor, is operable to perform operations comprising:
    maintaining a first count of packets received by a target evolved Node B (eNodeB) that are forwarded from a source eNodeB during a handover of a user equipment (UE) from the source eNodeB to the target eNodeB;
    receiving a second end marker indication message communicated from the source eNodeB to the target eNodeB, wherein the second end marker indication message includes, in a Private Extension Information Element (IE), a second count of packets transmitted by the source eNodeB for the target eNodeB upon handover of the UE to the target eNodeB, wherein the source eNodeB is configured to receive a first end marker indication message, and in response, generate the second end marker indication message and transmit the second end marker indication message to the target eNodeB;

parsing the Private Extension IE in the second end marker indication to recover the second count of packets; and comparing the second count of packets and the first count of packets, and in response determining that data has been lost during the handover and in response at least one of: (i) recording information related to the lost data, the recorded information suitable for use in generating loss statistics, or (ii) triggering an alarm at the target eNodeB related to the lost data.

12. The media of claim 11, wherein maintaining the count of packets includes maintaining a count of packets for each bearer of the UE.

13. The media of claim 12, wherein a separate end marker indication message is communicated to the target eNodeB for each bearer of the UE using a separate tunnel established for each bearer of the UE and wherein each tunnel is a General Packet Radio Service (GPRS) Tunneling Protocol (GTP) user data plane (GTPU) tunnel.

14. The media of claim 11, wherein the Private Extension IE includes an extension identifier having a value of 46606.

15. The media of claim 14, wherein the count of packets provided in the Private Extension IE is configured in a Tag, Length, Value (TLV) format.

16. The media of claim 14, the operations further comprising:
determining Radio Link Control (RLC) tuning parameters at the source eNodeB, wherein the RLC tuning parameters are included in the Private Extension IE along with the count of packets.

17. A first evolved node B (eNodeB) comprising:
a memory element for storing data; and
a processor to execute instructions associated with the data that, when executed, the eNodeB is configured to:
maintain a first count of packets to received by a target evolved Node B (eNodeB) that are forwarded from a source eNodeB during a handover of a user equipment (UE) from the source eNodeB to the target eNodeB;

receive a second end marker indication message communicated from the source eNodeB to the target eNodeB, wherein the second end marker indication message includes, in a Private Extension Information Element (IE), a second count of packets transmitted by the source eNodeB for the target eNodeB upon handover of the UE to the target eNodeB, wherein the source eNodeB is configured to receive a first end marker indication message, and in response, generate the second end marker indication message and transmit the second end marker indication message to the target eNodeB;

parse the Private Extension IE in the second end marker indication to recover the second count of packets; and compare the second count of packets and the first count of packets, and in response determining that data has been lost during the handover and in response at least one of: (i) recording information related to the lost data, the recorded information suitable for use in generating loss statistics, or (ii) triggering an alarm at the target eNodeB related to the lost data.

18. The first eNodeB of claim 17, wherein maintaining the count of packets includes maintaining a count of packets for each bearer of the UE.

19. The first eNodeB of claim 18, wherein a separate end marker indication message is communicated to the second eNodeB for each bearer of the UE using a separate tunnel established for each bearer of the UE and wherein each tunnel is a General Packet Radio Service (GPRS) Tunneling Protocol (GTP) user data plane (GTPU) tunnel.

20. The first eNodeB of claim 17, wherein the Private Extension IE includes an extension identifier having a value of 46606.

* * * * *

UNITED STATES PATENT AND TRADEMARK OFFICE
CERTIFICATE OF CORRECTION

PATENT NO.        : 10,524,173 B2
APPLICATION NO.   : 15/089271
DATED             : December 31, 2019
INVENTOR(S)       : Shetigar Nagesh et al.

Page 1 of 1

It is certified that error appears in the above-identified patent and that said Letters Patent is hereby corrected as shown below:

In the Claims

In Column 27, Line 34, in Claim 17, after "packets" delete "to".

Signed and Sealed this
Twenty-fifth Day of February, 2020

Andrei Iancu
*Director of the United States Patent and Trademark Office*